US012586927B2

(12) United States Patent
Tsukahara et al.

(10) Patent No.: US 12,586,927 B2
(45) Date of Patent: Mar. 24, 2026

(54) ANTENNA STRUCTURE AND ANTENNA ARRAY STRUCTURE

(71) Applicant: Panasonic Intellectual Property Management Co., Ltd., Osaka (JP)

(72) Inventors: Norihito Tsukahara, Kyoto (JP); Masato Mori, Hyogo (JP); Takayuki Sotoyama, Kanagawa (JP); Naoki Adachi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 18/897,135

(22) Filed: Sep. 26, 2024

(65) Prior Publication Data

US 2025/0015514 A1 Jan. 9, 2025

Related U.S. Application Data

(63) Continuation of application No. PCT/JP2023/005269, filed on Feb. 15, 2023.

(30) Foreign Application Priority Data

Apr. 4, 2022 (JP) ................................ 2022-062576

(51) Int. Cl.
*H01Q 21/06* (2006.01)
*H01Q 9/04* (2006.01)

(52) U.S. Cl.
CPC ......... *H01Q 21/065* (2013.01); *H01Q 9/0414* (2013.01); *H01Q 9/0442* (2013.01)

(58) Field of Classification Search
CPC ............. H01Q 21/0006; H01Q 21/065; H01Q 9/0442; H01Q 21/08; H01Q 9/0414
See application file for complete search history.

(56) References Cited

U.S. PATENT DOCUMENTS

2021/0151874 A1* 5/2021 Sudo .................... H01Q 21/065
2023/0238691 A1* 7/2023 Yoshino ................... H04B 3/56 343/711

FOREIGN PATENT DOCUMENTS

JP 06-041220 U 5/1994
JP 06-152237 5/1994
(Continued)

OTHER PUBLICATIONS

International Search Report of PCT application No. PCT/JP2023/005269 dated Apr. 4, 2023.

*Primary Examiner* — Monica C King
(74) *Attorney, Agent, or Firm* — Wenderoth, Lind & Ponack, L.L.P.

(57) ABSTRACT

An antenna structure includes: an antenna board including a first surface and a second surface located that is opposite to the first surface; patch antenna elements arrayed on the first surface of the antenna board; a feeding electrode formed on the second surface of the antenna board and electrically connected to each of the patch antenna elements; a power supply control board that is disposed away from the second surface of the antenna board, extends in a direction intersecting the second surface of the antenna board, and includes a third surface and a fourth surface that is opposite to the third surface; and a connection member disposed on the second surface of the antenna board and on at least one of the third surface and the fourth surface of the power supply control board, the connection member electrically connecting the feeding electrode and the power supply control board.

8 Claims, 20 Drawing Sheets

21

(56) References Cited

FOREIGN PATENT DOCUMENTS

| | | |
|---|---|---|
| JP | 2001-345133 | 12/2001 |
| JP | 2004-260107 | 9/2004 |
| JP | 2011-035733 | 2/2011 |

* cited by examiner

[S1]

[S2]

ANTENNA STRUCTURE AND ANTENNA ARRAY STRUCTURE

TECHNICAL FIELD

The present disclosure relates to an antenna structure and an antenna array structure.

BACKGROUND ART

In recent years, commercial services by fifth generation (5G) mobile communication systems have been started, and it is expected to further accelerate sophistication of multimedia services and provide new value as a basic technology that supports industries and society.

5G is a mobile communication system that handles high frequency bands such as millimeter waves exceeding 10 GHz. As a transmission and reception antenna, a patch antenna (microstrip antenna), which is a type of planar antenna including a dielectric substrate, radiation elements with wiring formed on both surfaces of the dielectric substrate, and a ground conductor plate as components, is generally used.

Furthermore, in order to obtain a desired radiation directionality (radiation pattern), a multi-element antenna array is often used in which a plurality of patch antennas are regularly arrayed in a straight line or in a plane. The multi-element antenna array enables large-capacity communication. An antenna element such as a patch antenna is connected to various signal processing circuits and power feeding circuits to constitute an antenna structure (antenna module). Then, the antenna structure is housed in a housing such as a case or a cover, and is practically used as an antenna unit for communication.

For example, PTL 1 discloses an antenna structure and an antenna unit configured by an antenna element part and a circuit part that amplifies an electric signal converted by the antenna element part.

In PTL 1, the antenna element part and the circuit part are configured separately from each other, connected to each other by a cable, and disposed side by side and housed in an external case, thereby configuring an antenna unit.

In recent years, an antenna structure including a plurality of antenna elements is used to cope with large-capacity communication, but since an installation place thereof is limited, there is an increasing demand for downsizing of the antenna structure.

Therefore, for example, PTL 2 discloses an antenna structure for realizing downsizing of an antenna device. The antenna structure of PTL 2 includes a ground conductor, an antenna element part formed on an upper surface of the ground conductor via a first dielectric substrate, and a circuit part including a circuit pattern formed on a lower surface of the ground conductor via a second dielectric substrate, a circuit component to be mounted, and the like.

CITATION LIST

Patent Literatures

PTL 1: Unexamined Japanese Utility Model Publication No. H06-041220

PTL 2: Unexamined Japanese Patent Publication No. H06-152237

SUMMARY OF THE INVENTION

An antenna structure according to one aspect of the present disclosure includes: an antenna board including a first surface and a second surface that is opposite to the first surface; a plurality of patch antenna elements arrayed on the first surface of the antenna board; a feeding electrode formed on the second surface of the antenna board and electrically connected to each of the plurality of patch antenna elements; a power supply control board that is disposed away from the second surface of the antenna board, extends in a direction intersecting the second surface of the antenna board, and includes a third surface and a fourth surface that is opposite to the third surface; and a connection member disposed on a side of the second surface of the antenna board and on at least one of the third surface and the fourth surface of the power supply control board, the connection member electrically connecting the feeding electrode and the power supply control board, in which the power supply control board includes a connection terminal, and the connection member includes: a body having an insulation property; an electrode part formed on a surface of the body; a first joint that joins the electrode part and the feeding electrode by metal joining; and a second joint that joins the electrode part and the connection terminal by metal joining.

DESCRIPTION OF EMBODIMENT

Figure 1:
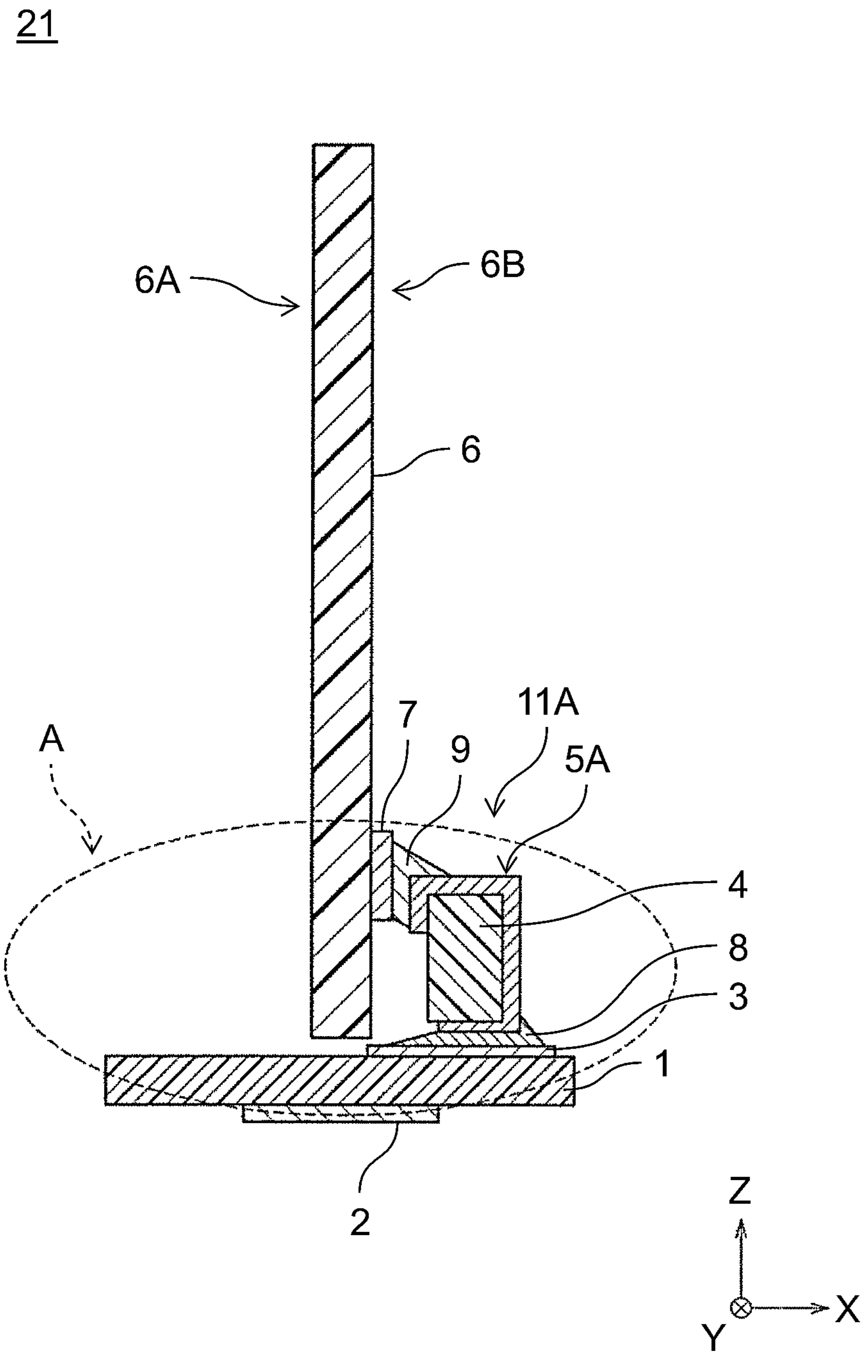
FIG. 1 is an end view on an X-Z plane illustrating an example of a configuration of an antenna structure of Example 1 according to a first exemplary embodiment.

In the structure of the antenna structure of PTL 1, both the antenna element part and the circuit part are provided in a planar direction. In the configuration in which an area where the antenna element part and the circuit part are provided together is secured in the planar direction, it is difficult to downsize the device.

Furthermore, the overall size of the antenna structure is determined by the mounting area of the circuit component mounted on a surface opposite to a surface of the dielectric substrate on which the antenna element part is disposed. For this reason, in the structure of the antenna structure disclosed in PTL 2, even if the antenna element is downsized, it is difficult to realize a small antenna structure having a mounting area less than or equal to the mounting area of the circuit component.

Furthermore, even in a case where a plurality of the antenna elements is arranged to form an antenna array structure, since an interval at which the antenna elements are arranged is restricted by the mounting area of the circuit component mounted on the opposite surface side of the dielectric substrate from the surface on which the antenna element part is disposed, it is difficult to realize an antenna array structure in which a plurality of small antenna elements is arranged by narrow adjacent mounting.

Therefore, an object of the present disclosure is to provide an antenna structure that facilitates downsizing of an antenna device.

According to a first aspect of the present disclosure, provided is an antenna structure including: an antenna board including a first surface and a second surface that is opposite to the first surface; a plurality of patch antenna elements arrayed on the first surface of the antenna board; a feeding electrode formed on the second surface of the antenna board and electrically connected to each of the plurality of patch antenna elements; a power supply control board that is disposed away from the second surface of the antenna board, extends in a direction intersecting the second surface of the antenna board, and includes a third surface and a fourth surface that is opposite to the third surface; and a connection member disposed on a side of the second surface of the antenna board and on at least one of the third surface and the fourth surface of the power supply control board, the connection member electrically connecting the feeding electrode and the power supply control board, in which the power supply control board includes a connection terminal, and the connection member includes: a body having an insulation property; an electrode part formed on a surface of the body; a first joint that joins the electrode part and the feeding electrode by metal joining; and a second joint that joins the electrode part and the connection terminal by metal joining.

According to this aspect, it is possible to provide an antenna structure that facilitates downsizing of an antenna device.

According to a second aspect of the present disclosure, there is provided the antenna structure according to the first aspect, in which the connection member includes: a first connection member disposed on the third surface of the power supply control board; and a second connection member that is disposed on the fourth surface of the power supply control board and faces the first connection member with a gap between the first connection member and the second connection member, and the power supply control board includes an end disposed in the gap.

A third aspect of the present disclosure provides the antenna structure according to the second aspect, in which the gap has a width L in a direction in which the first connection member, the second connection member are arranged, and the power supply control board has a thickness T, $(T+0.05\ \text{mm})<L<(T+1\ \text{mm})$ is satisfied.

According to a fourth aspect of the present disclosure, there is provided the antenna structure according to the first or second aspect, in which the connection member is disposed along a direction in which the plurality of patch antenna elements is arrayed.

A fifth aspect of the present disclosure provides the antenna structure according to the first or second aspect, in which the body of the connection member contains a resin material, and the resin material includes any one of LCP, PPA, ABS, PEEK, and PC.

A sixth aspect of the present disclosure provides the antenna structure according to the first or second aspect, in which the first joint has a composition different from a composition of the second joint.

According to a seventh aspect of the present disclosure, there is provided an antenna array structure including a plurality of the antenna structures according to the first or second aspect, in which the plurality of patch antenna elements is arrayed along a first direction on the first surface of the antenna board, and the plurality of antenna structures is arrayed along a second direction orthogonal to the first direction.

According to an eighth aspect of the present disclosure, there is provided the antenna array structure according to the seventh aspect, in which the antenna boards adjacent to each other include adjacent end surfaces between which an interval is greater than 0 mm and less than or equal to 10 mm in a direction of array of the plurality of antenna structures.

Note that by appropriately combining discretionary exemplary embodiments among the various exemplary embodiments described above, the effects of the respective exemplary embodiments can be achieved.

Hereinafter, exemplary embodiments will be described in detail with reference to the drawings as appropriate. However, descriptions more in detail than necessary may be omitted. For example, the detailed description of already well-known matters and the redundant description of substantially identical configurations may be omitted. This is to avoid unnecessary redundancy in the following description and to facilitate understanding of those skilled in the art.

An antenna structure, an antenna array structure, and a method of manufacturing the same according to a first exemplary embodiment of the present invention will be described with reference to FIGS. 1 to 10. The accompanying drawings and the following description are provided for those skilled in the art to fully understand the present disclosure, and are not intended to limit the subject matter described in the claims. Furthermore, in each drawing, elements are exaggerated in order to facilitate explanation. Note that, in the drawings, substantially the same members are denoted by the same reference marks.

First Exemplary Embodiment (Configuration of Antenna Structure of Example 1)

Figure 2:
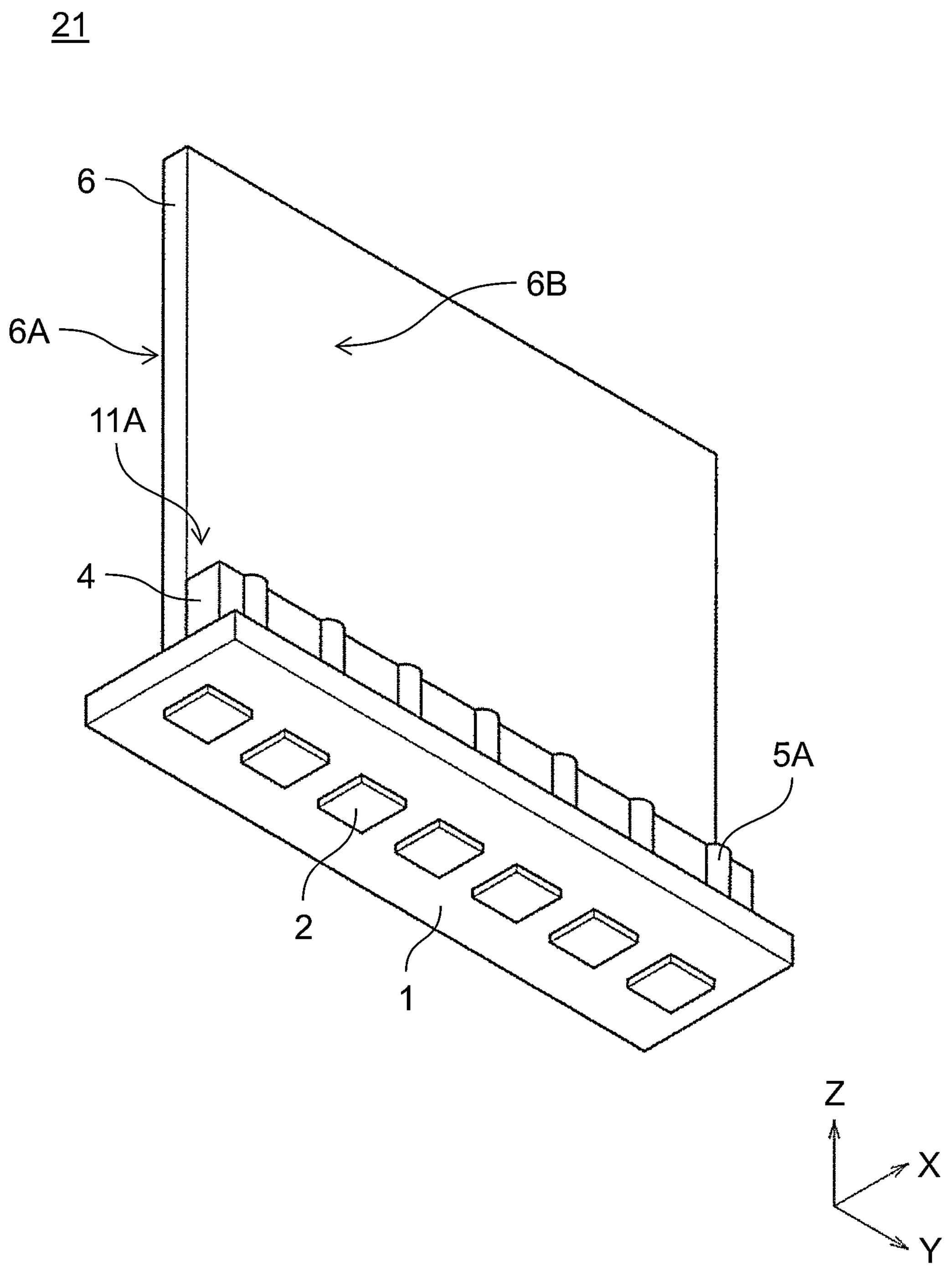
FIG. 2 is a perspective view illustrating an example of a configuration of the antenna structure of Example 1 according to the first exemplary embodiment.
Figure 3:
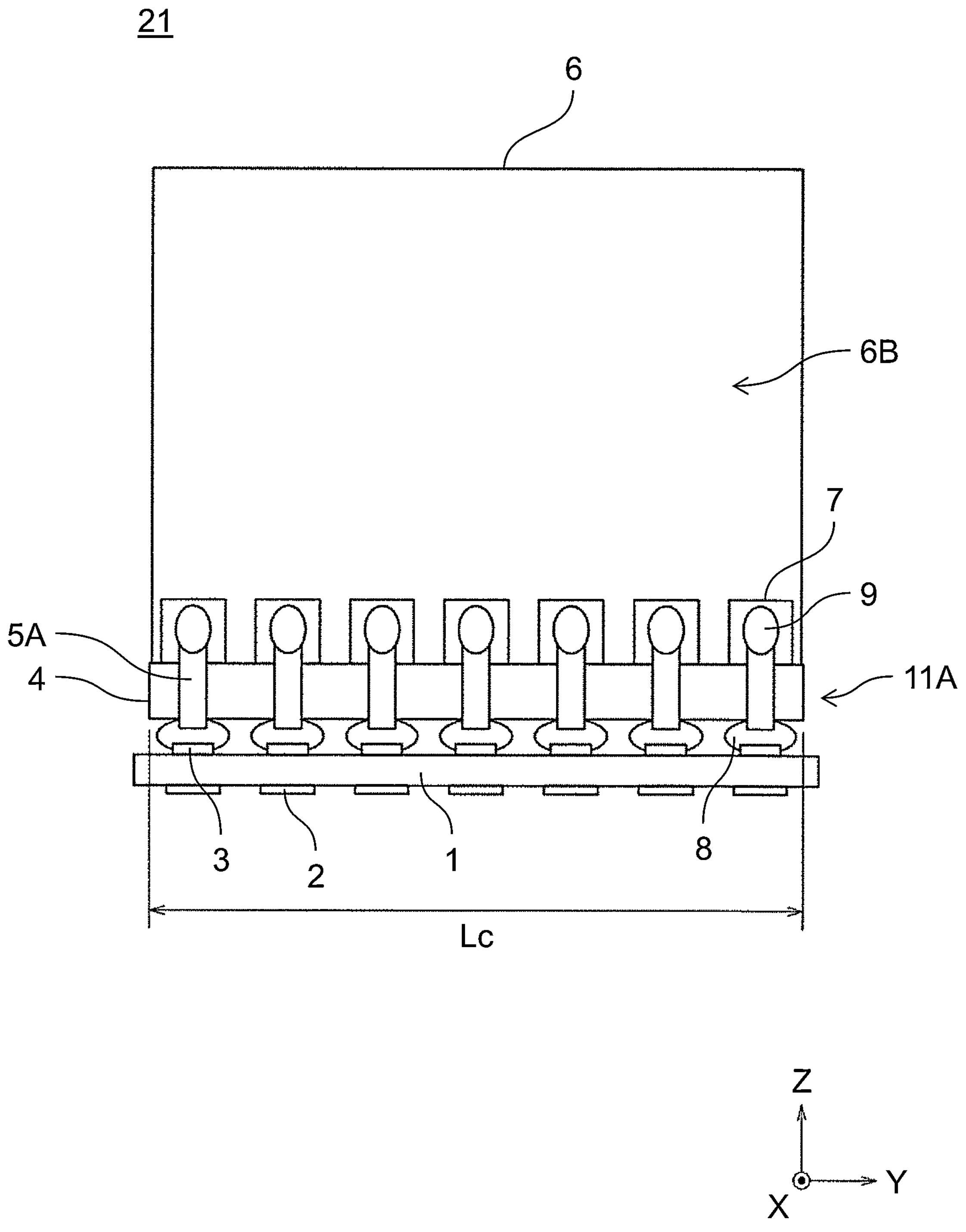
FIG. 3 is a front view on a Y-Z plane illustrating an example of a configuration of the antenna structure of Example 1 according to the first exemplary embodiment.

An overall configuration of an antenna structure according to a first exemplary embodiment of the present disclosure will be described with reference to FIGS. 1 to 3. FIG. 1 is an end view on an X-Z plane illustrating an example of a configuration of antenna structure 21 of Example 1 according to the first exemplary embodiment. FIG. 2 is a perspective view illustrating an example of a configuration of antenna structure 21 of Example 1 according to the first exemplary embodiment. FIG. 3 is a front view on a Y-Z plane illustrating an example of a configuration of antenna structure 21 of Example 1 according to the first exemplary embodiment.

As illustrated in FIG. 1, antenna structure 21 according to the present exemplary embodiment includes antenna board 1, power supply control board 6, and connection member 11A. In the present exemplary embodiment, antenna board 1 is disposed parallel to an X-Y plane, and power supply control board 6 is disposed away from an upper surface (a surface on a +Z side in the drawing) parallel to the X-Y plane of antenna board 1, and can extend in a direction intersecting an upper surface of antenna board 1. In the exemplary embodiment illustrated in FIGS. 1 to 3, power supply control board 6 extends parallel to the Y-Z plane orthogonal to antenna board 1. Connection member 11A is disposed on a side of surface 6B of power supply control board 6 on a +X side in the drawing, extending in parallel with the Y-Z plane, and connects antenna board 1 and power supply control board 6. The configuration of connection member 11A will be described in detail later. Note that, in the present specification, a surface on the illustrated-Z side parallel to the X-Y plane of antenna board 1 is referred to as a “lower surface” or a “first surface”, and a surface on the opposite side (surface on the illustrated+Z side) is referred to as an “upper surface” or a “second surface”. Furthermore, surface 6A on the −X side in the drawing parallel to the Y-Z plane of power supply control board 6 is referred to as a “third surface”, and surface 6B on the opposite side (the surface on the +X side in the drawing) is referred to as a “fourth surface”.

In the present exemplary embodiment, a multilayer board material “MEGTRON7” manufactured by Panasonic Corporation is used as a base material of antenna board 1. “MEGTRON7” is a multilayer board material having low transmission loss characteristics. By using this, it is possible to realize highly efficient antenna performance and to design a board with a high degree of freedom. However, antenna board 1 is not limited to “MEGTRON7”, and may be, for example, other glass epoxy materials or ceramic materials. Furthermore, the shape and dimension of antenna board 1 can be produced according to the application. In the present exemplary embodiment, as illustrated in FIGS. 2 and 3, antenna board 1 has a rectangular shape on the X-Y plane, and is produced so that a width in the X direction in the drawing is 3 mm, a length in the Y direction is 22 mm, and a thickness in the Z direction is 0.8 mm.

As illustrated in FIG. 2, a plurality of patch antenna elements 2 is arrayed along the Y direction in the drawing on the lower surface (first surface) of antenna board 1. In the present exemplary embodiment, patch antenna element 2 is made of a copper foil having a thickness of 18 μm, and has a rectangular shape having dimensions of 2 mm×2 mm. Furthermore, in the present exemplary embodiment, as illustrated in FIG. 2, antenna structure 21 includes seven rectangular patch antenna elements 2, and these patch antenna elements 2 are arrayed linearly along the Y direction in the drawing at equal intervals of 1 mm. As described above, by linearly arraying the plurality of patch antenna elements 2 along the longitudinal direction (Y direction in the drawing) of rectangular antenna board 1, a compact antenna structure can be configured.

Note that the present disclosure does not limit the shape, number, array interval, or the like of the patch antenna elements included in the antenna structure. Patch antenna element 2 may have another shape such as a circular shape, for example, and the number of patch antenna elements constituting antenna structure 21 may be provided according to the application of the antenna structure. Moreover, the plurality of patch antenna elements 2 may be arrayed at equal intervals, or may be arrayed at different intervals.

As illustrated in FIGS. 1 and 3, a plurality of feeding electrodes 3 are disposed on an upper surface (second surface) of antenna board 1 opposite to the surface on which patch antenna elements 2 are disposed. Feeding electrode 3 is electrically connected to the plurality of patch antenna elements 2 by a through hole, for example, and is used to supply power to patch antenna elements 2. In the present exemplary embodiment, as illustrated in FIG. 3, feeding electrode 3 includes a plurality of electrodes arrayed along the Y direction in the drawing on the upper surface of antenna board 1 so as to face the array of patch antenna elements 2 on the lower surface. Thus, feeding electrode 3 can separately feed power to each of the plurality of patch antenna elements 2. Furthermore, by arraying the individual electrodes included in feeding electrode 3 along the array direction of patch antenna elements 2, a more compact antenna structure can be configured.

Power supply control board 6 can be configured by, for example, mounting circuit components (not illustrated) constituting a signal circuit and a power feeding circuit on double-sided printed boards. Power supply control board 6 includes connection terminal 7, and in the present exemplary embodiment, connection terminal 7 includes a plurality of terminals provided along the Y direction in the drawing. Each of the plurality of terminals is electrically connected to each of patch antenna elements 2 through electrode part 5A (described later) of connection member 11A and feeding electrode 3. As a result, power supply control board 6 can apply a predetermined excitation amplitude phase distribution to each of patch antenna elements 2 to realize a desired radiation directionality of antenna structure 21. Power supply control board 6 can be disposed so as to extend in a direction intersecting the upper surface of antenna board 1. In the present exemplary embodiment, power supply control board 6 is disposed on the Y-Z plane in parallel with the array direction of patch antenna elements 2. Thus, the antenna structure can be made more compact.

The shape and size of power supply control board 6 can be produced according to the application. In the present exemplary embodiment, as illustrated, power supply control board 6 is disposed on the Y-Z plane parallel to the array direction of patch antenna elements 2, and has a rectangular shape on the Y-Z plane. Furthermore, in the present exemplary embodiment, power supply control board 6 is produced to have a length of 22 mm in the Y direction, a length of 25 mm in the Z direction, and a thickness of 1.6 mm in the X direction in the drawing.

Figure 4A:
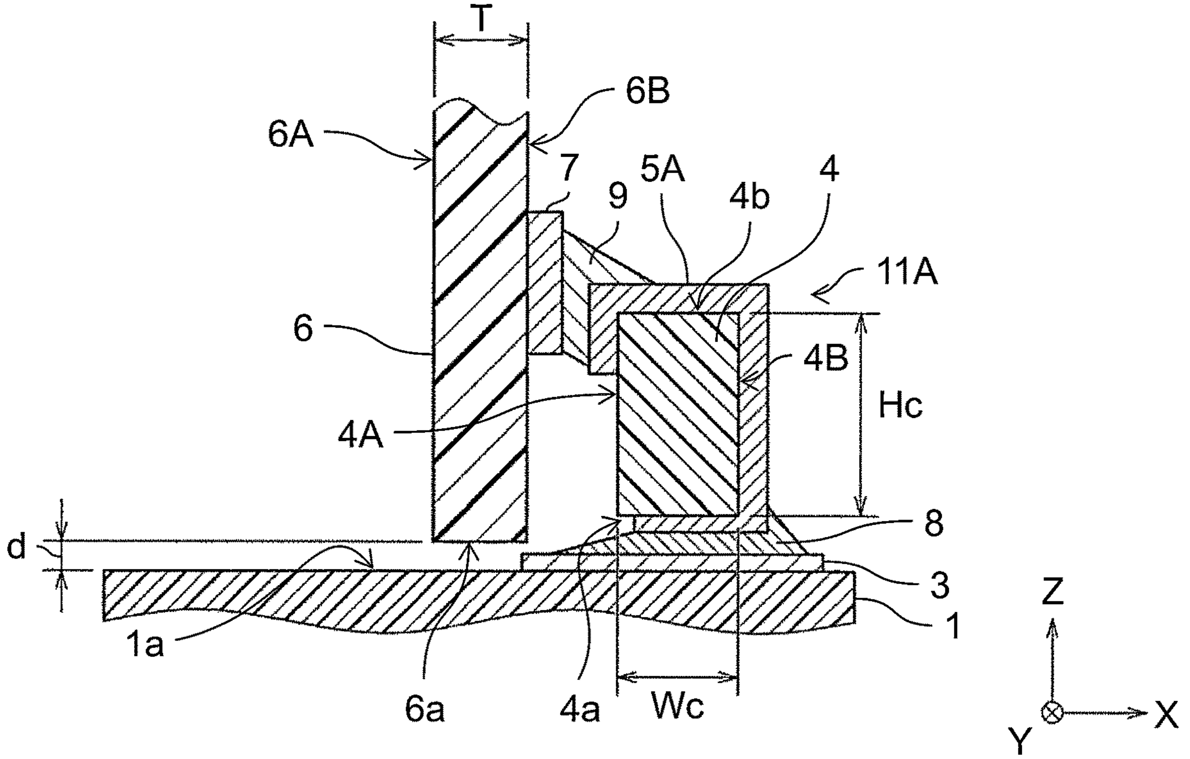
FIG. 4A is an enlarged view of portion A in FIG. 1 illustrating an example of a configuration of a connection member of the antenna structure according to Example 1.
Figure 4B:
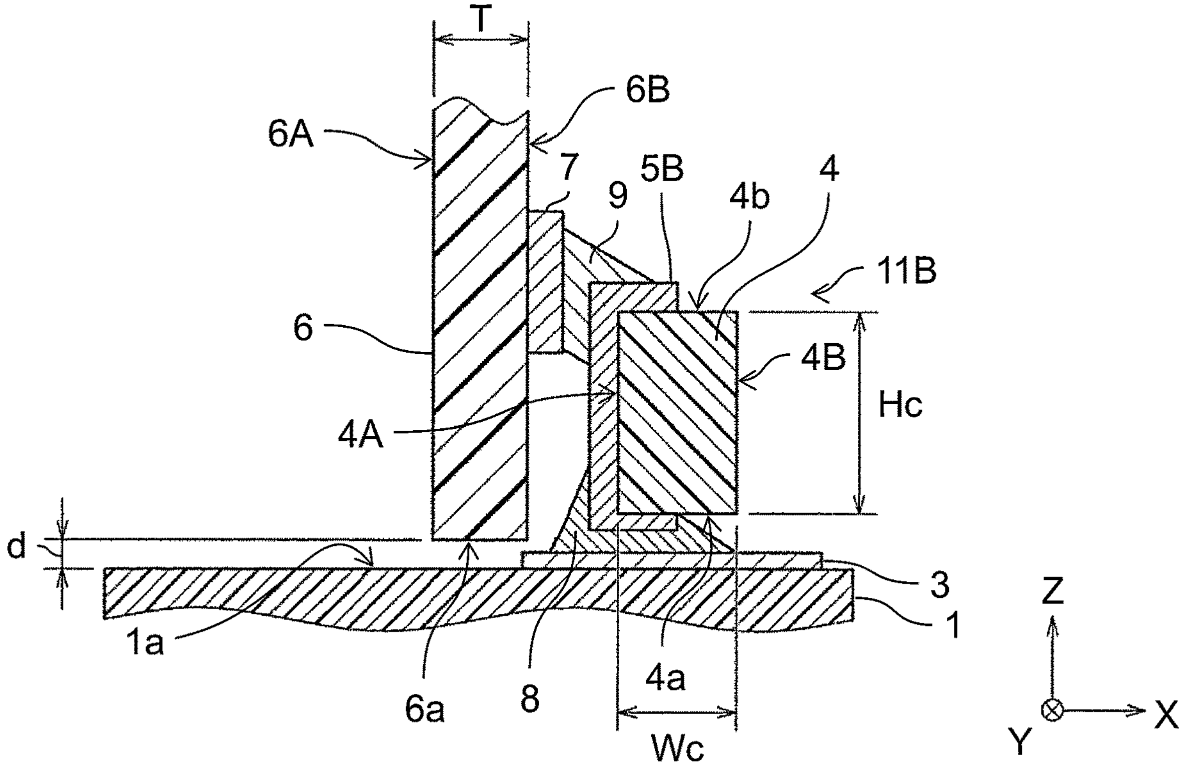
FIG. 4B is a diagram illustrating an example of a configuration of a connection member according to a modification of Example 1.
Figure 4C:
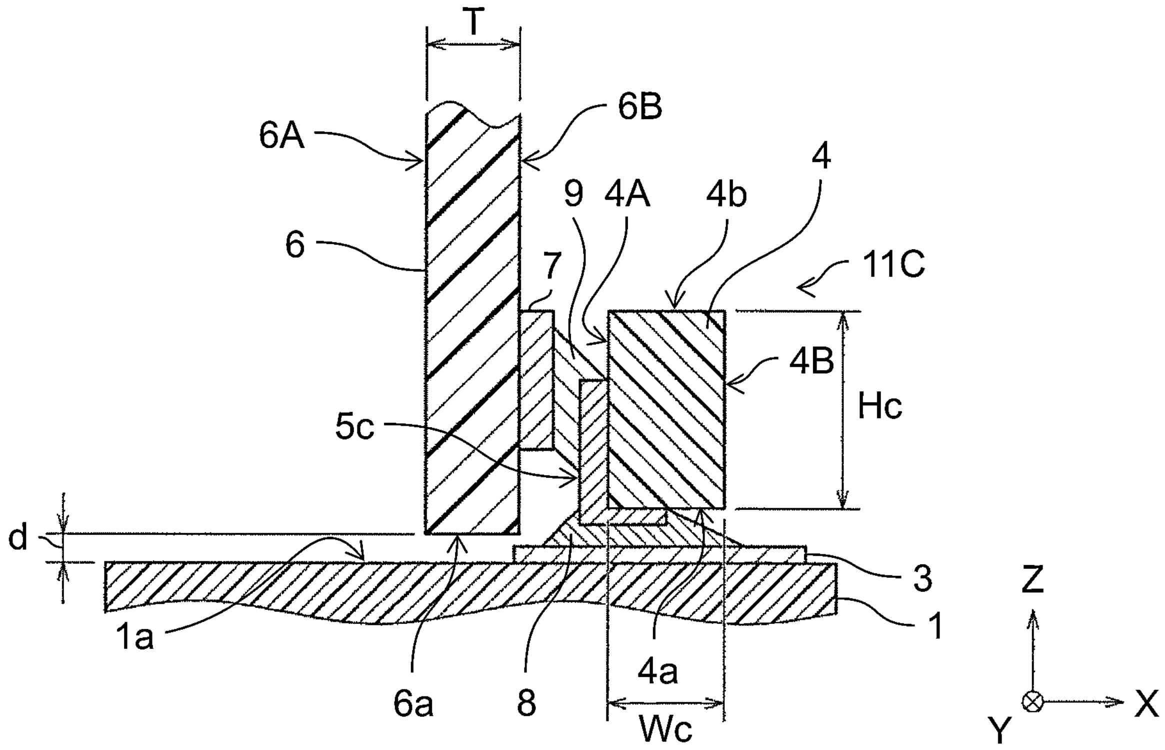
FIG. 4C is a diagram illustrating another example of a configuration of the connection member according to the modification of Example 1.

In antenna structure 21 of Example 1, antenna board 1 and power supply control board 6 are connected by a connection member. Hereinafter, configurations of connection members according to Example 1 and modifications will be described with reference to FIGS. 4A to 4C in addition to FIGS. 1 to 3. FIG. 4A is an enlarged view of portion A in FIG. 1 illustrating an example of a configuration of connection member 11A of antenna structure 21 according to Example 1. FIG. 4B is a diagram illustrating an example of a configuration of connection member 11B according to a modification of Example 1. FIG. 4C is a diagram illustrating another example of a configuration of connection member 11C according to the modification of Example 1.

(Configuration of Connection Member)

Connection member 11A of antenna structure 21 of Example 1 can be disposed on one side of third surface 6A and fourth surface 6B of power supply control board 6. Connection member 11A according to Example 1 includes body 4 having insulating properties, electrode part 5A formed on a surface of body 4, first joint 8, and second joint 9. First joint 8 joins electrode part 5A and feeding electrode 3, and second joint 9 joins electrode part 5A and connection terminal 7 of the power supply control board. Furthermore, both first joint 8 and second joint 9 are formed by metal joining. In this manner, connection member 11A can support power supply control board 6 extending in a direction intersecting the upper surface of antenna board 1 by electrically connecting and mechanically joining power supply control board 6 and feeding electrode 3. Note that connection members 11B, 11C according to the modification of Example 1 illustrated in FIGS. 4B and 4C are different from connection member 11A in the forms of electrode parts 5B, 5C, and the other configurations are substantially the same as those of connection member 11A and are denoted by the same reference marks.

The shapes and dimensions of connection members 11A, 11B, 11C can be produced according to the application. In the present exemplary embodiment, connection members 11A, 11B, 11C are disposed along the array direction of patch antenna elements 2 on the lower surface of antenna board 1, have a rectangular parallelepiped outer shape whose longitudinal direction extends in the Y direction in the drawing, and are disposed in parallel with power supply control board 6 disposed in parallel with the Y-Z plane. Thus, compact antenna structure 21 can be configured.

In the present exemplary embodiment, body 4 of each of connection members 11A, 11B, 11C is produced such that width Wc in the X direction in the drawing is 2.5 mm, height Hc in the Z direction is 3.0 mm, and length Lc in the Y direction (illustrated in FIG. 3) is 22 mm. Note that, in the present exemplary embodiment, power supply control board 6 and bodies 4 of connection members 11A, 11B, 11C are produced to have substantially the same length in the Y direction, but the present disclosure is not limited thereto. Power supply control board 6 and body 4 may have different lengths in the Y direction.

As illustrated in FIGS. 4A to 4C, but not limited thereto, in the present exemplary embodiment, connection terminal 7 is disposed near end 6*a* of power supply control board 6. Connection terminal 7 of power supply control board 6 is provided on fourth surface 6B of power supply control board 6, and power supply control board 6 can be held by joining connection terminal 7 to connection members 11A, 11B, 11C disposed on a side of fourth surface 6B by second joint 9. Note that power supply control board 6 is not limited to one in which connection terminal 7 is provided on fourth surface 6B and is connected to connection members 11A, 11B, 11C by second joint 9 on the side of fourth surface 6B. For example, connection terminal 7 may be provided on third surface 6A of power supply control board 6, and may be connected to connection members 11A, 11B, 11C by second joint 9 on a side of third surface 6A.

End 6*a* of power supply control board 6 may be disposed in contact with upper surface 1*a* of antenna board 1, or may be disposed at a predetermined distance from upper surface 1*a*. In the present exemplary embodiment, as illustrated in FIGS. 4A to 4C, end 6*a* of power supply control board 6 is disposed away from upper surface 1*a* of antenna board 1 by distance d. Distance d may be, for example, 0 mm or more and 2.0 mm or less. By disposing power supply control board 6 away from upper surface 1*a* of antenna board 1, a path through which air flows can be secured between power supply control board 6 and antenna board 1. As a result, the heat generated from the electronic component mounted on power supply control board 6 is dissipated, and the temperature rise of power supply control board 6 or antenna board 1 due to the heat generation of the electronic component can be suppressed.

Body 4 of each of connection members 11A, 11B, 11C is made of an insulating resin material. In the present exemplary embodiment, liquid crystal polymer (LCP) having a dielectric constant of 4.3 and a dielectric loss tangent of 0.015 is used for body 4, but body 4 is not limited thereto, and may include any one of liquid crystal polymer (LCP), polyphthalamide (PPA), acrylonitrile-butadiene-styrene copolymer synthetic resin (ABS), polyetheretherketone resin (PEEK), and polycarbonate resin (PC).

Electrode parts 5A, 5B, 5C of connection members 11A, 11B, 11C can be formed on the entire surface of body 4 or an arbitrary part thereof. In the present exemplary embodiment, for example, electrode part 5A according to Example 1 illustrated in FIG. 4A is formed on upper surface 4*b* of body 4, a part of lower surface 4*a*, a part of inner surface 4A facing power supply control board 6, and outer surface 4B facing the opposite side of power supply control board 6. Electrode part 5B according to a modification of Example 1 illustrated in FIG. 4B is formed on upper surface 4*b* of body 4, a part of lower surface 4*a*, and inner surface 4A. Moreover, electrode part 5C according to a modification of Example 1 illustrated in FIG. 4C is formed on a part of lower surface 4*a* of body 4 and a part of inner surface 4A. Note that the electrode part of the connection member is not limited to these forms, and may be formed in a form further different from the examples illustrated in FIGS. 4A to 4C depending on the application.

In the present exemplary embodiment, electrode parts 5A, 5B, 5C are sequentially formed of copper (Cu) having a thickness of 10 μm, nickel (Ni) having a thickness of 0.2 μm, and gold (Au) having a thickness of 0.05 μm by a plating method. Electrode parts 5A, 5B, 5C are not limited to those formed by the plating method, and may be formed by other materials or methods such as printing of a conductive resin and dispensing coating.

First joint 8 that joins electrode parts 5A, 5B, 5C and feeding electrode 3 and second joint 9 that joins electrode parts 5A, 5B, 5C and connection terminal 7 of the power supply control board are both formed by metal joining. As a result, first joint 8 and second joint 9 can have both electrical conductivity and mechanical strength. In the present exemplary embodiment, first joint 8 is formed using a solder having a composition of Sn-3.0Ag-0.5Cu, and second joint 9 is formed using a Sn—Bi solder. Note that the metal joining material constituting first joint 8 and second joint 9 is not limited thereto, and for example, a conductive paste such as Ag or Cu, or another joining material may be used. Moreover, first joint 8 and second joint 9 can be made of metal joining materials having different compositions. This will be described in detail later.

(Configuration of Antenna Structure of Example 2)

Figure 5:
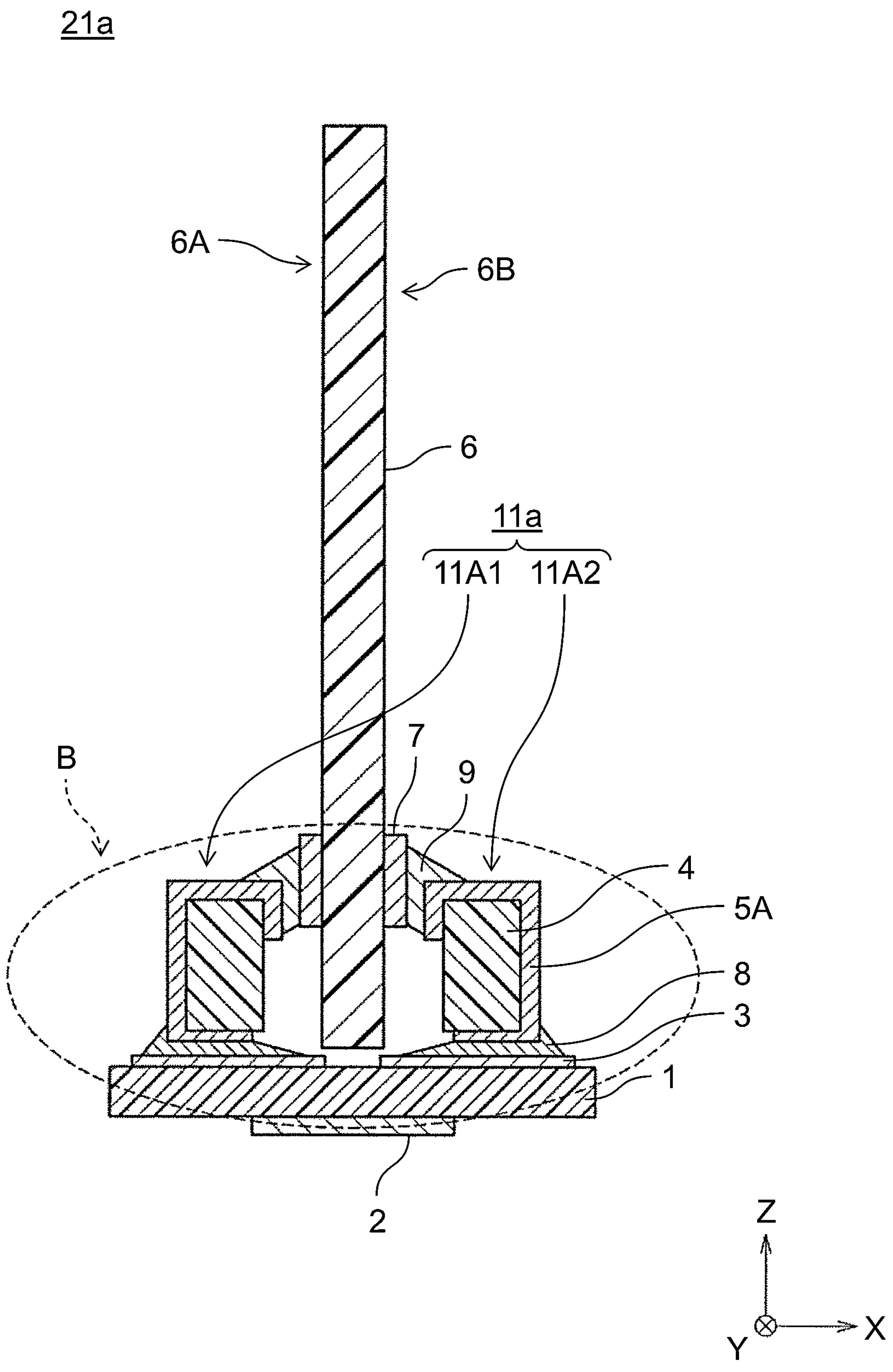
FIG. 5 is an end view on an X-Z plane illustrating an example of a configuration of an antenna structure of Example 2 according to the first exemplary embodiment.
Figure 6A:
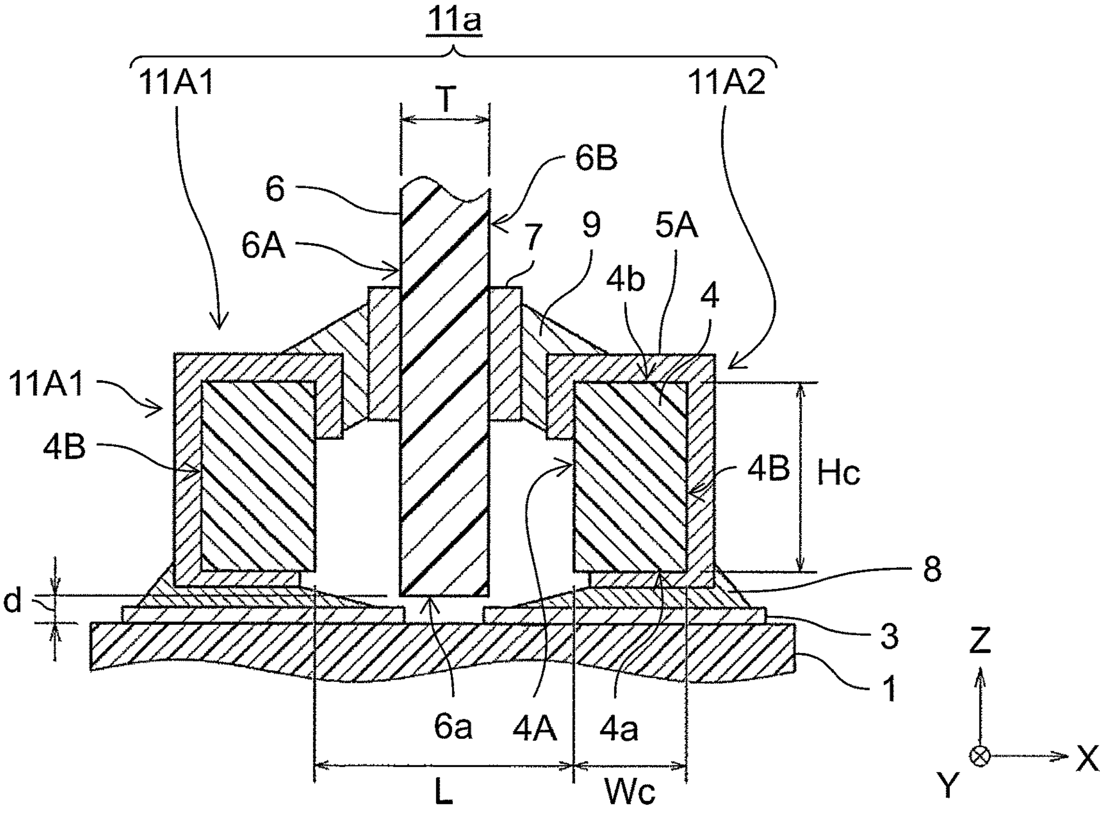
FIG. 6A is an enlarged view of portion B in FIG. 5 illustrating an example of a configuration of a connection member of the antenna structure according to Example 2.
Figure 6B:
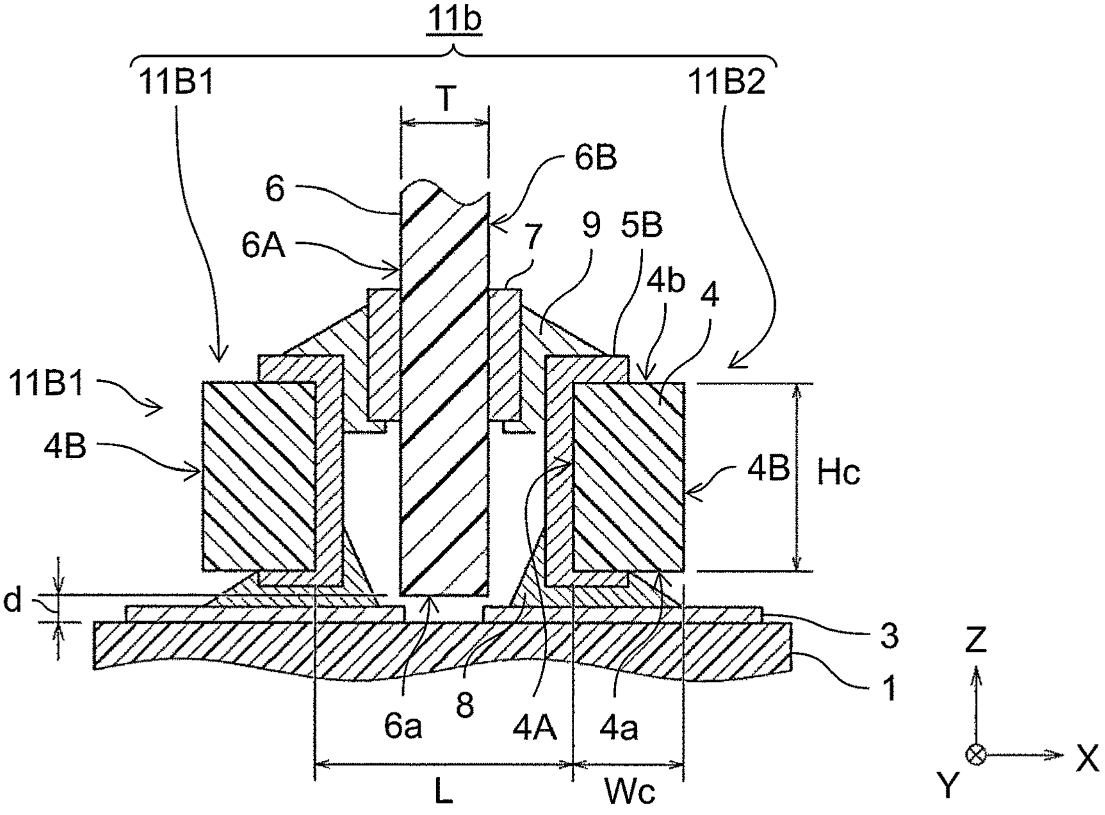
FIG. 6B is a diagram illustrating an example of a configuration of a connection member according to a modification of Example 2.
Figure 6C:
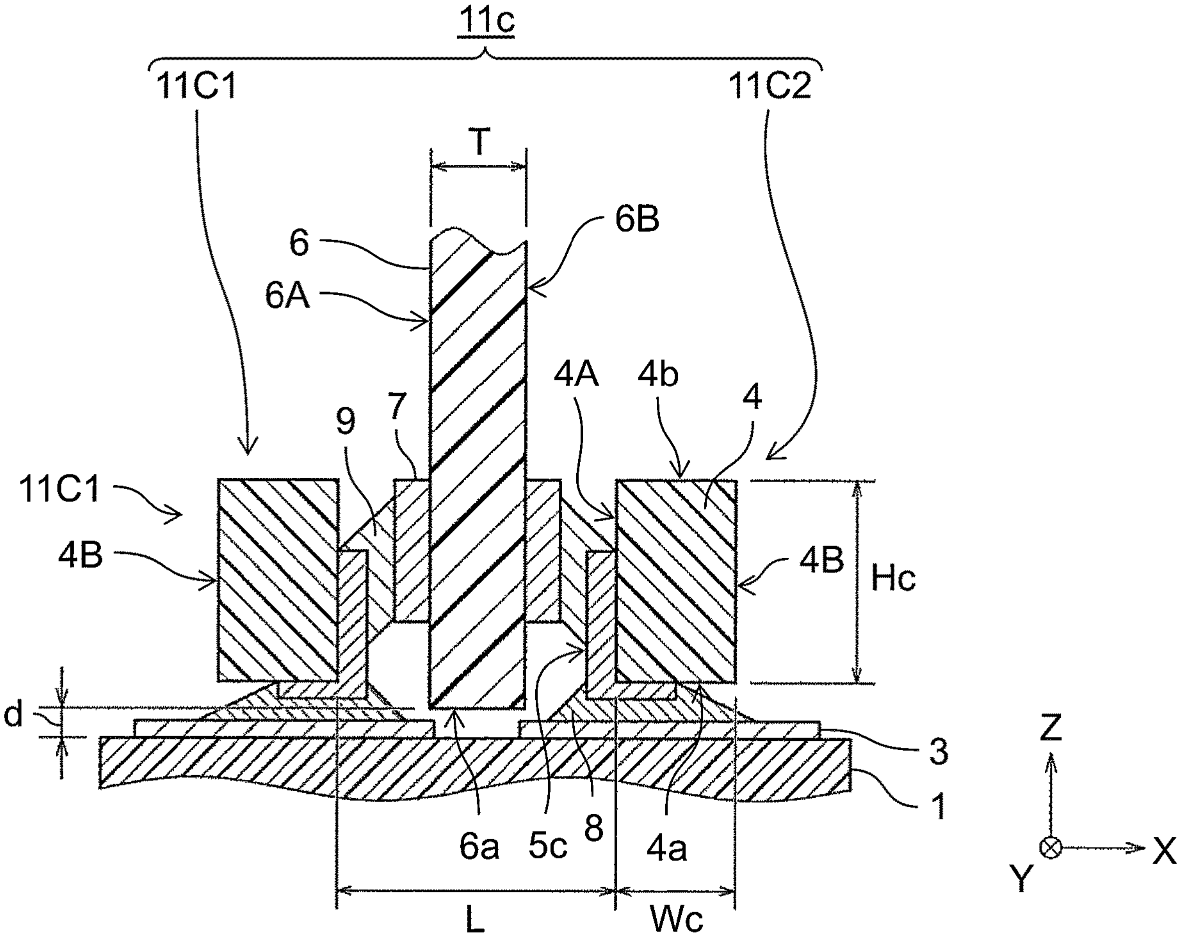
FIG. 6C is a diagram illustrating another example of a configuration of the connection member according to the modification of Example 2.

A configuration of an antenna structure of Example 2 according to the first exemplary embodiment of the present disclosure will be described with reference to FIGS. 5 to 6C. FIG. 5 is an end view on the X-Z plane illustrating an example of a configuration of antenna structure 21*a* of Example 2 according to the first exemplary embodiment. FIG. 6A is an enlarged view of portion B in FIG. 5 illustrating example 11*a* of a configuration of the connection member of antenna structure 21*a* according to Example 2. FIG. 6B is a diagram illustrating example 11*b* of a configuration of a connection member according to a modification of Example 2. FIG. 6C is a diagram illustrating another example 11*c* of a configuration of the connection member according to the modification of Example 2.

Antenna structure 21*a* of Example 2 illustrated in FIG. 5 includes antenna board 1, power supply control board 6, and connection member 11*a*. In the present exemplary embodiment, antenna board 1 is disposed parallel to the X-Y plane, and power supply control board 6 is disposed away from an upper surface (surface on the +Z side in the drawing) of antenna board 1 parallel to the X-Y plane, extends in a direction intersecting the upper surface of antenna board 1, and is disposed parallel to the Y-Z plane in the drawing. Connection member 11*a* is disposed on a side of the upper surface of antenna board 1, and connects antenna board 1 and power supply control board 6. As illustrated in the drawing, antenna structure 21*a* of Example 2 is different from antenna structure 21 of Example 1 illustrated in FIG. 1 in that connection member 11*a* includes first connection member 11A1 disposed on the side of third surface 6A of power supply control board 6 and second connection member 11A2 disposed on the side of fourth surface 6B and facing first connection member 11A1 with a gap interposed therebetween.

Each of first connection member 11A1 and second connection member 11A2 of connection member 11*a* of antenna structure 21*a* includes body 4 with insulation properties, electrode part 5A formed on the surface of body 4, first joint 8, and second joint 9. First joint 8 connects electrode part 5A and feeding electrode 3, and second joint 9 connects electrode part 5A and connection terminal 7 of the power supply control board. Furthermore, both first joint 8 and second joint 9 are formed by metal joining. As described above, connection member 11*a* can support power supply control board 6 extending in a direction intersecting the upper surface of antenna board 1 by electrically connecting and mechanically joining power supply control board 6 and feeding electrode 3.

As illustrated in FIG. 6A, each of first connection member 11A1 and second connection member 11A2 of connection member 11*a* can be configured substantially similarly to connection member 11A according to Example 1 illustrated in FIG. 4A. Furthermore, first connection member 11B1 and second connection member 11B2 of connection member 11*b* according to the modification of Example 2 illustrated in FIG. 6B can be configured substantially similarly to connection member 11B according to the modification of Example 1 illustrated in FIG. 4B. Moreover, each of first connection member 11C1 and second connection member 11C2 of connection member 11*c* according to the modification of Example 2 illustrated in FIG. 6C can be configured substantially similarly to connection member 11C according to the modification of Example 1 illustrated in FIG. 4C. Hereinafter, detailed description of first connection member 11A1 and second connection member 11A2 of connection member 11*a* according to Example 2, and first connection members 11B1, 11C1 and second connection members 11B2, 11C2 of connection members 11*b* and 11*c* according to the modifications of Example 2 will be omitted.

As illustrated in FIGS. 5 to 6C, in antenna structure 21*a*, end 6*a* of power supply control board 6 is disposed in a gap between the first connection member and the second connection member of each of connection members 11*a*, 11*b*, 11*c*. Furthermore, although not limited thereto, in the present exemplary embodiment, connection terminal 7 is disposed near end 6*a* of power supply control board 6, and as illustrated in the drawing, connection terminal 7 is provided on each of third surface 6A and fourth surface 6B parallel to the Y-Z plane of power supply control board 6. Each of connection terminals 7 provided on third surface 6A and fourth surface 6B of power supply control board 6 is joined to each of the first connection member and the second connection member of each of connection members 11*a*, 11*b*, 11*c* by second joint 9. As a result, power supply control board 6 can be stably held, and antenna structure 21 having a structure resistant to vibration and impact can be configured. Note that power supply control board 6 is not limited to the power supply control board 6 in which connection terminals 7 are provided on both third surface 6A and fourth surface 6B and are connected to the first connection member and the second connection member. For example, connection terminal 7 may be provided on one of third surface 6A and fourth surface 6B of power supply control board 6, and may be connected to one of the first connection member and the second connection member by second joint 9.

In the present exemplary embodiment, the first connection member and the second connection member of each of connection members 11*a*, 11*b*, 11*c* have a rectangular parallelepiped outer shape whose longitudinal direction extends in the Y direction in the drawing, and are disposed along a direction in which patch antenna elements 2 are arrayed to form a gap parallel to the Y direction. Since end 6*a* of power supply control board 6 is disposed in the gap, compact antenna structure 21*a* can be configured.

A dimension of the gap between the first connection member and the second connection member of each of connection members 11*a*, 11*b*, 11*c* can be produced according to the application. Since end 6*a* of power supply control board 6 is disposed in the gap, width L of the gap in the direction in which the first connection member and the second connection member are arranged is larger than at least thickness T of power supply control board 6. For example, width L of the gap in the X direction in the drawing and thickness T of power supply control board 6 can be configured to satisfy (T+0.05 mm)<L<(T+1 mm). In the present exemplary embodiment, width L of the gap is 2 mm and thickness T of power supply control board 6 is 1.6 mm in the X direction in the drawings. Furthermore, as illustrated in the drawings, in antenna structure 21*a* according to Example 2, end 6*a* of power supply control board 6 is disposed away from upper surface 1*a* of antenna board 1 by distance d, similarly to antenna structure 21 according to Example 1. As a result, a path through which air flows is secured between power supply control board 6 and antenna board 1, and a temperature rise of power supply control board 6 or antenna board 1 due to heat generation of electronic components mounted on power supply control board 6 can be suppressed.

Body 4 of the first connection member and the second connection member, electrode parts 5A, 5B, 5C, first joint 8, and second joint 9 of each of connection members 11*a*, 11*b*, 11*c* according to Example 2 can be produced by substantially the same configurations, dimensions, methods, and the like as those of connection members 11A, 11B, 11C according to Example 1 described above. Here, detailed description is omitted.

As described above, antenna board 1 disposed in parallel with the X-Y plane and power supply control board 6 extending in the direction intersecting the upper surface of antenna board 1 are connected by connection members 11A, 11B, 11C or 11*a*, 11*b*, 11*c* to constitute antenna structures 21, 21*a* according to the first exemplary embodiment of the present disclosure.

According to such a configuration, since patch antenna element 2 and power supply control board 6 on which circuit components constituting a signal circuit and a power feed circuit are mounted are disposed in directions intersecting each other, it is possible to provide antenna structures 21, 21*a* that facilitate the downsizing of the antenna device without restricting the arrangement of the antenna elements due to the mounting area of the circuit components constituting the signal circuit and the power feeding circuit, for example.

Next, a configuration of an antenna array structure according to the first exemplary embodiment will be described with reference to FIGS. 7 to 10.

(Configuration of Antenna Array Structure)

Figure 7:
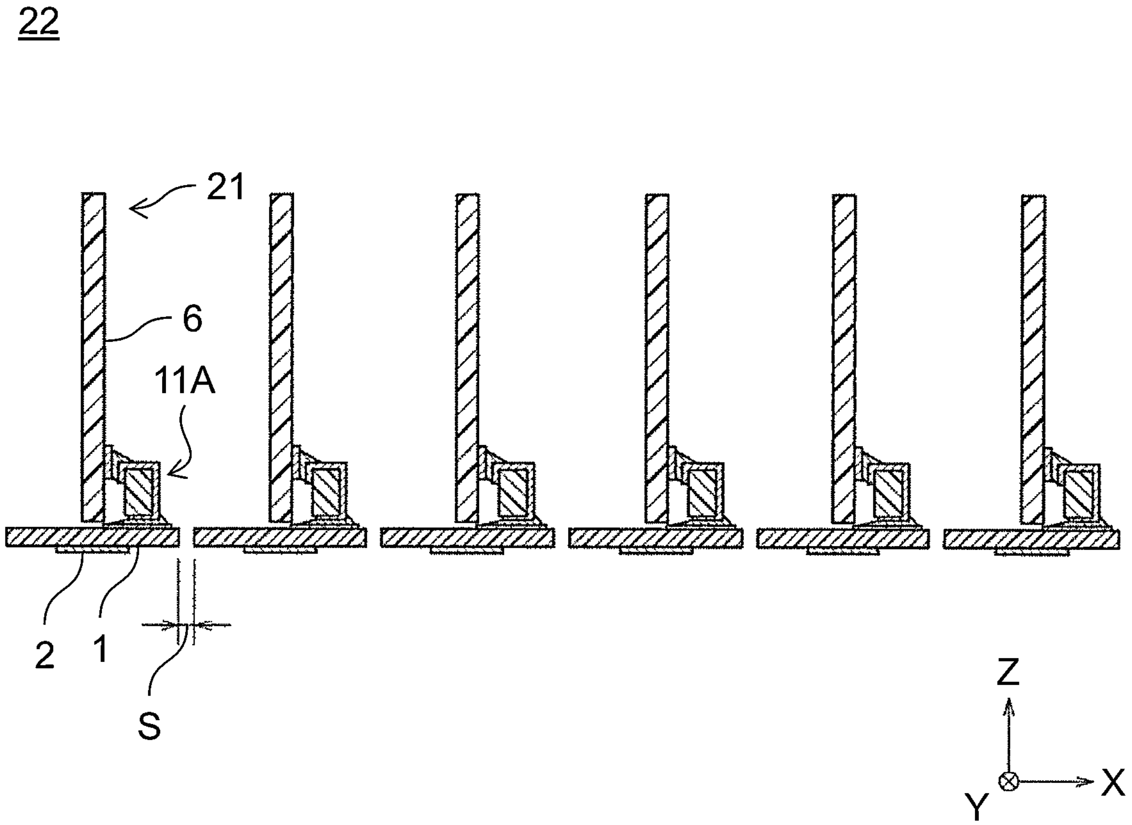
FIG. 7 is an end view on an X-Z plane illustrating an example of a configuration of an antenna array structure of Example 1 according to the first exemplary embodiment.
Figure 8:
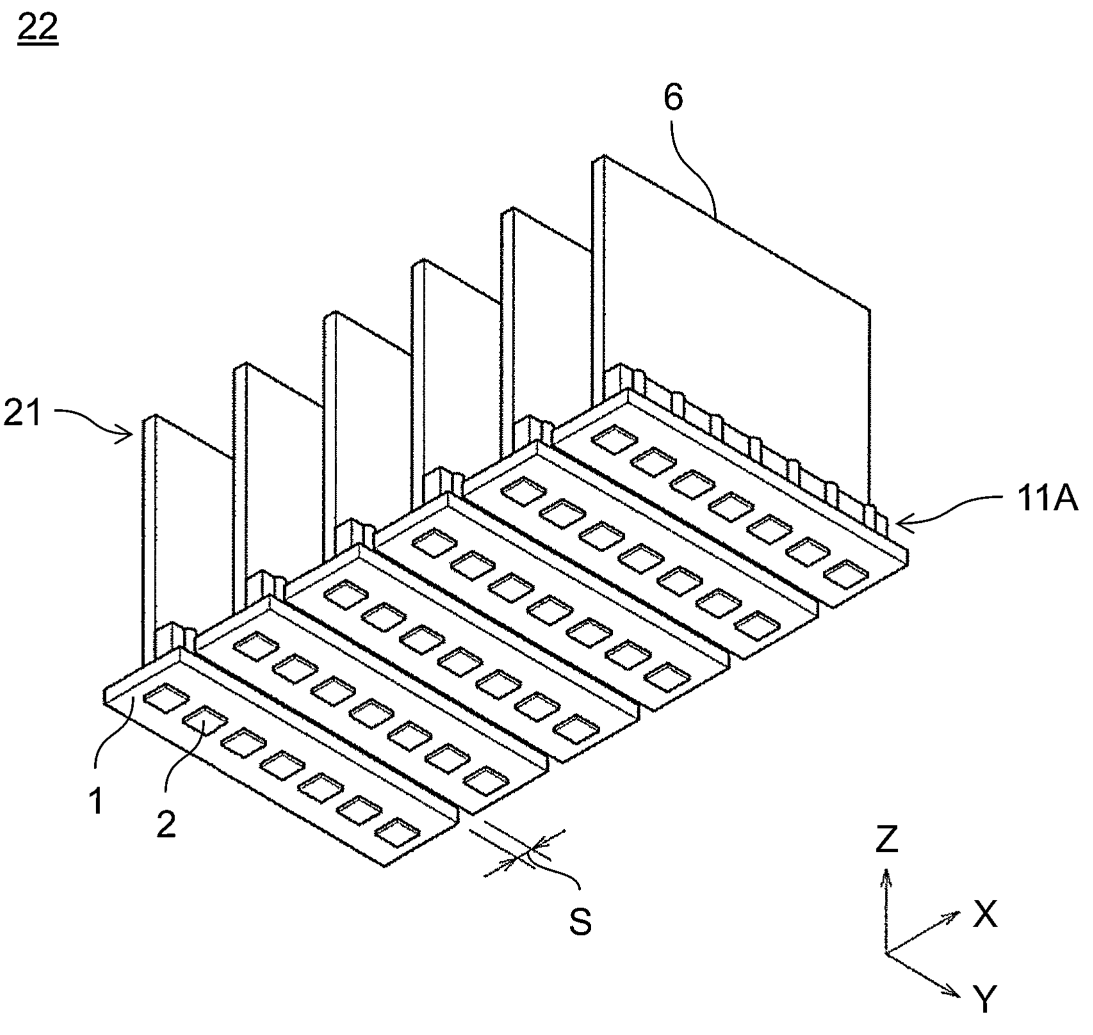
FIG. 8 is a perspective view illustrating an example of a configuration of the antenna array structure of Example 1 according to the first exemplary embodiment.
Figure 9:
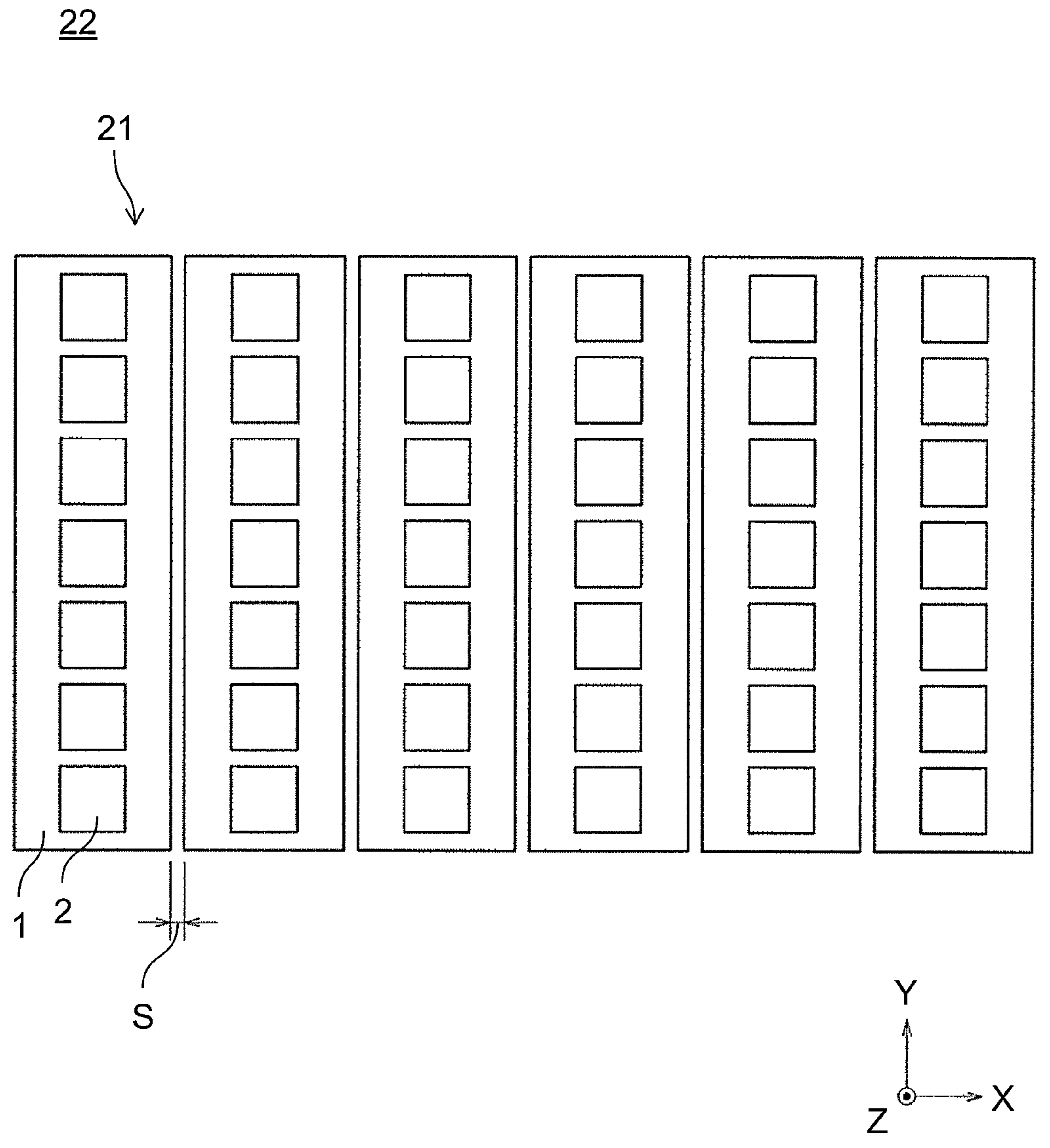
FIG. 9 is a plan view on an X-Y plane illustrating an example of a configuration of the antenna array structure of Example 1 according to the first exemplary embodiment.

FIG. 7 is an end view on the X-Z plane illustrating an example of a configuration of antenna array structure 22 according to the first exemplary embodiment. FIG. 8 is a perspective view illustrating an example of a configuration of antenna array structure 22 according to the first exemplary embodiment. FIG. 9 is a plan view on the X-Y plane illustrating an example of a configuration of antenna array structure 22 according to the first exemplary embodiment.

As illustrated in FIGS. 7 to 9, antenna array structure 22 includes a plurality of antenna structures 21 of Example 1 according to the first exemplary embodiment. In the present exemplary embodiment, the plurality of patch antenna elements 2 of each of antenna structures 21 is arrayed along the Y direction in the drawings on the lower surface (first surface) of the antenna board. Furthermore, the plurality of antenna structures 21 is arrayed in a direction orthogonal to an array direction of patch antenna elements 2, that is, the X direction in the drawings in the present exemplary embodiment. As described above, antenna array structure 22 including the array of patch antenna elements 2 arranged in a matrix is configured.

The number of antenna structures 21 constituting antenna array structure 22 can be provided according to the application of the antenna array structure. In the present exemplary embodiment, as illustrated in FIGS. 8 and 9, antenna array structure 22 includes six antenna structures 21, and each of antenna structures 21 includes seven patch antenna elements 2. Antenna array structure 22 configured as described above includes 7×6 patch antenna elements 2. For example, in a case where m antenna structures 21 are provided and each of antenna structures 21 includes n patch antenna elements 2, antenna array structure 22 including n×m patch antenna elements 2 is configured. By using an antenna array structure including a large number of patch antenna elements, large-capacity communication can be realized.

In antenna array structure 22, each of antenna structures 21 may be arrayed at equal intervals, or may be arrayed at different intervals. In the present exemplary embodiment, as illustrated in FIGS. 7 to 9, antenna boards 1 are disposed at equal intervals in the X direction in which six antenna structures 21 are arrayed. Furthermore, although not limited thereto, in the present exemplary embodiment, each of antenna structures 21 constituting antenna array structure 22 includes antenna board 1 having a rectangular shape in the X-Y plane. In the array direction of antenna structures 21 (In the present exemplary embodiment, the X direction in the drawings), interval S between the adjacent end surfaces of adjacent antenna boards 1 is configured to be 0.5 mm. By arraying antenna boards 1 at intervals, the heat generated by the circuit components mounted on power supply control board 6 of each of antenna structures 21 is dissipated, and the temperature rise of power supply control board 6 due to the heat generation of the circuit components can be suppressed. In the array direction of antenna structures 21, interval S between the adjacent end surfaces of adjacent antenna boards 1 may be, for example, larger than 0 mm and smaller than or equal to 10 mm.

According to the configuration of antenna structure 21 of the present disclosure, patch antenna element 2 and power supply control board 6 on which the circuit components constituting the signal circuit and the power feeding circuit are mounted are disposed in directions intersecting each other. Therefore, when the plurality of antenna structures 21 is disposed in antenna array structure 22, for example, the plurality of antenna structures 21 can be arrayed without restricting interval S by power supply control board 6 or the circuit components mounted on power supply control board 6. Therefore, antenna array structure 22 in which patch antenna elements 2 of the respective antenna structures are arranged on a matrix in a narrow adjacent manner can be configured, and thus, it is possible to provide a small antenna array device.

Figure 10:
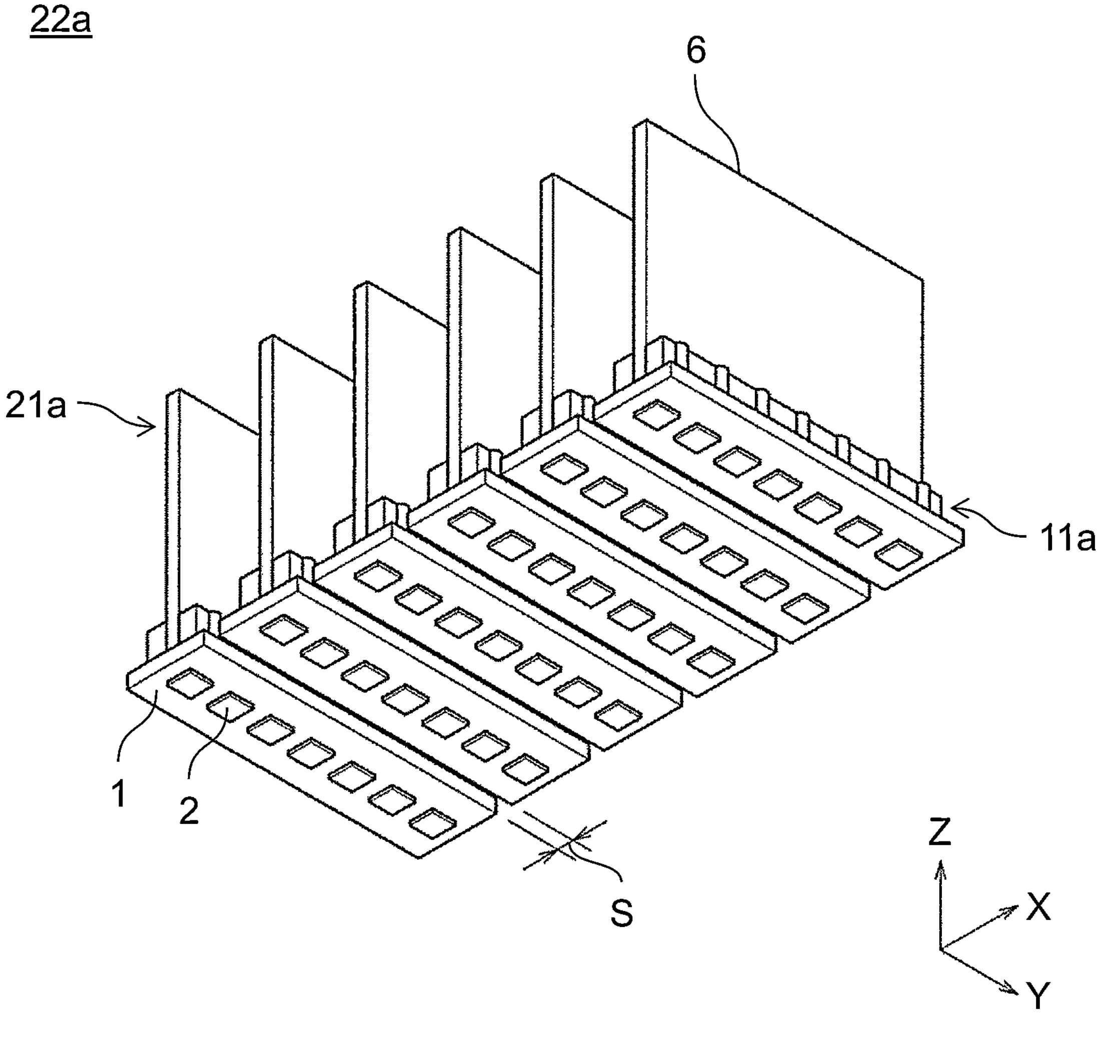
FIG. 10 is a perspective view illustrating an example of a configuration of an antenna array structure by the antenna structure of Example 2 according to the first exemplary embodiment.

Similarly, the antenna array structure can be configured using the plurality of antenna structures 21*a* according to Example 2. FIG. 10 is a perspective view illustrating an example of a configuration of antenna array structure 22*a* by antenna structures 21*a* of Example 2 according to the first exemplary embodiment. Furthermore, the connection member according to each modification of antenna structures 21, 21*a* can be naturally applied to the configuration of the antenna array structure. Here, detailed description is omitted.

The antenna array structure can further constitute an antenna unit by assembling with a housing. A configuration of the antenna unit will be described with reference to FIGS. 11 to 14.

(Configuration of Antenna Unit)

Figure 11:
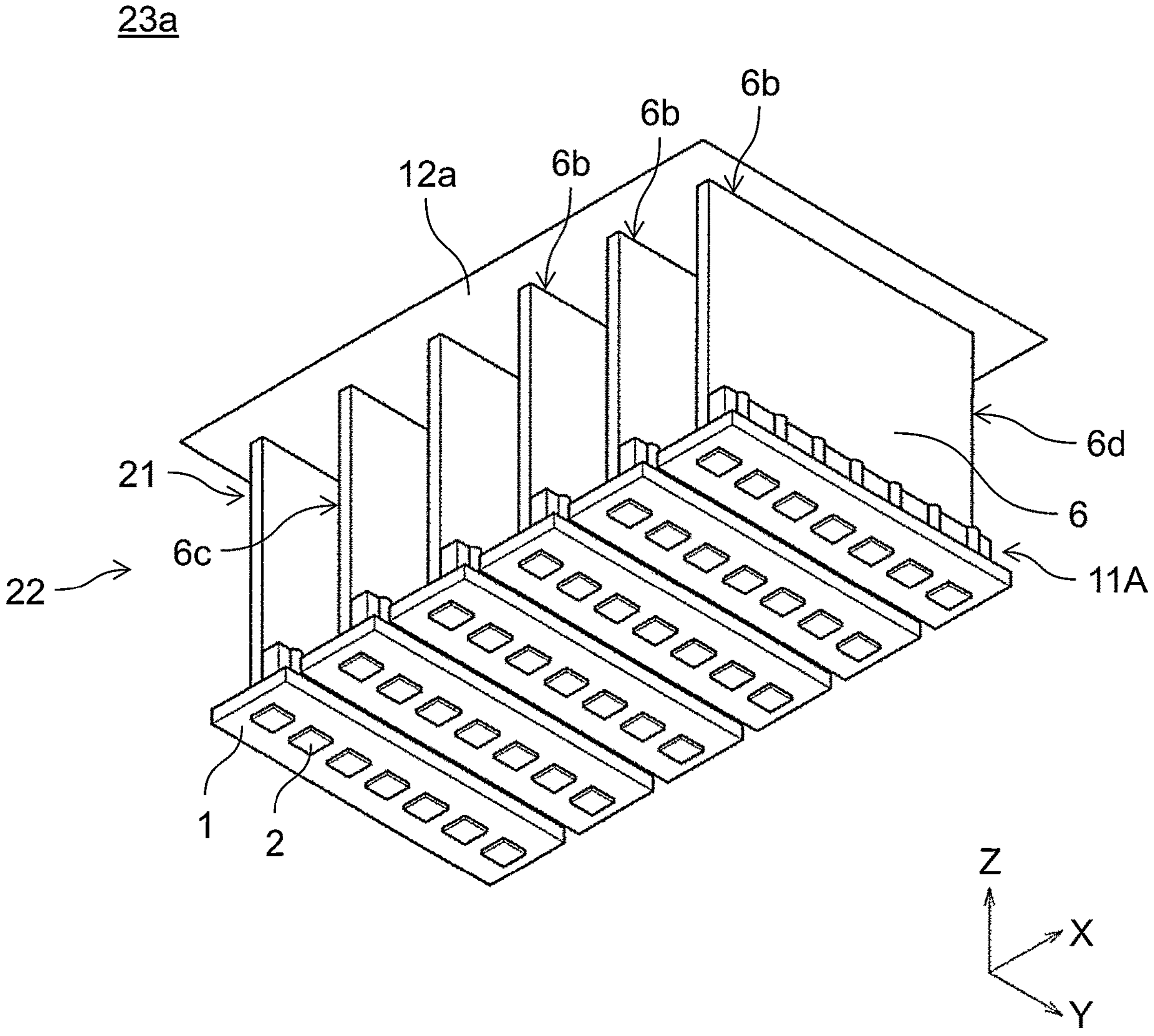
FIG. 11 is a perspective view illustrating an example of a configuration of an antenna unit in which the antenna array structure of FIG. 7 and a housing are assembled.
Figure 12:
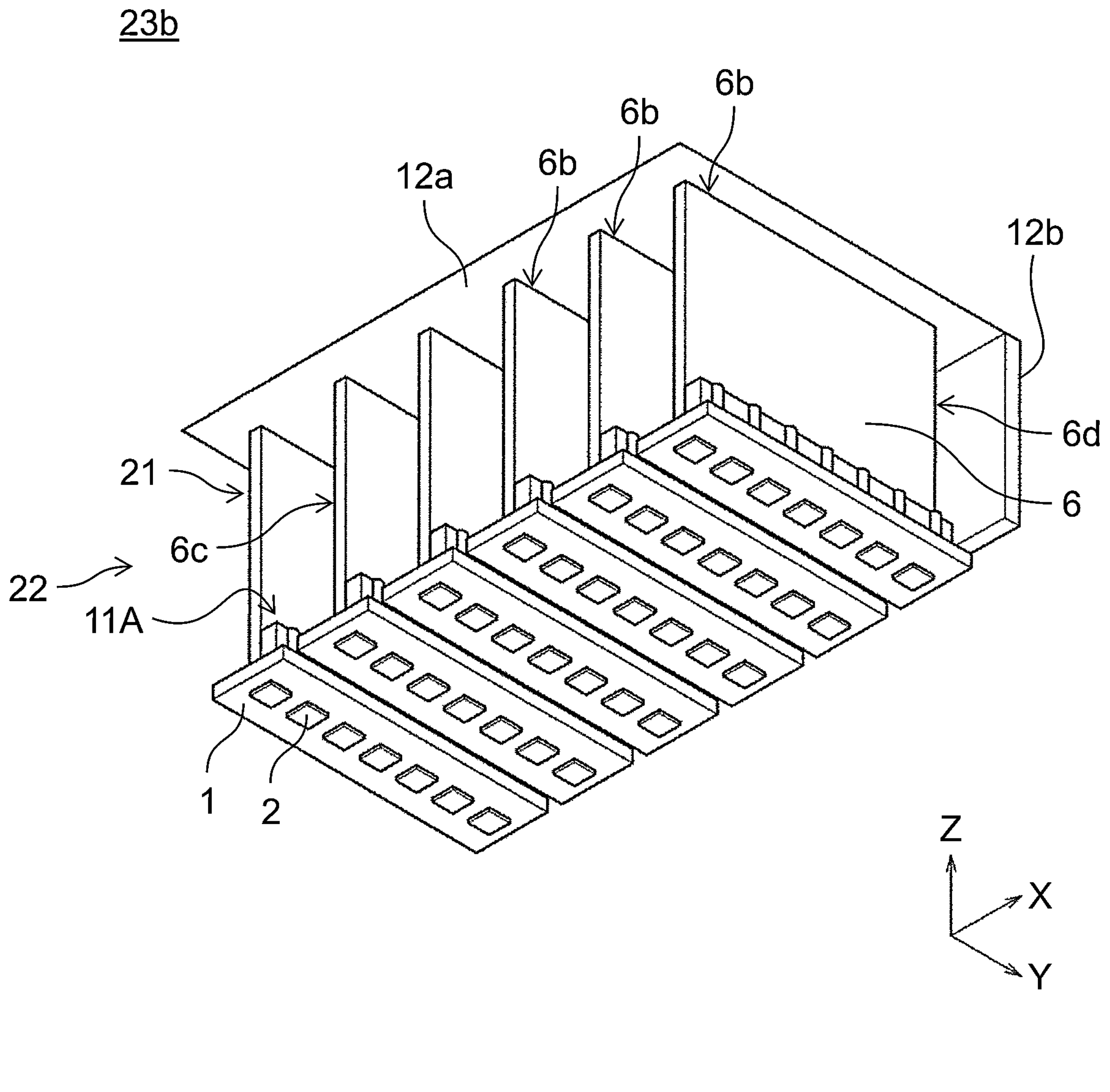
FIG. 12 is a perspective view illustrating another example of a configuration of the antenna unit in which the antenna array structure of FIG. 7 and a housing are assembled.

FIG. 11 is a perspective view illustrating example 23*a* of a configuration of an antenna unit in which antenna array structure 22 of FIG. 7 and housing 12*a* are assembled. FIG. 12 is a perspective view illustrating another example 23*b* of a configuration of an antenna unit in which antenna array structure 22 of FIG. 7 and housings 12*a*, 12*b* are assembled.

Antenna unit 23*a* illustrated in FIG. 11 is configured by attaching ends 6*b* (upper end on the +Z side in the drawing) on the opposite side of ends 6*a* close to antenna boards 1 of the plurality of power supply control boards 6 of antenna array structure 22 to housing 12*a*. In antenna unit 23*b* illustrated in FIG. 12, ends 6*b* of the plurality of power supply control boards 6 of the antenna array structure 22 are attached to housing 12*a*. Moreover, along the array direction (X direction in the drawing) of antenna array structure 22, one or both (not illustrated) of portions 6*c*, 6*d* on both sides connecting end 6*a* and end 6*b* of each power supply control board 6 can be attached to housing 12*b*.

Figure 13:
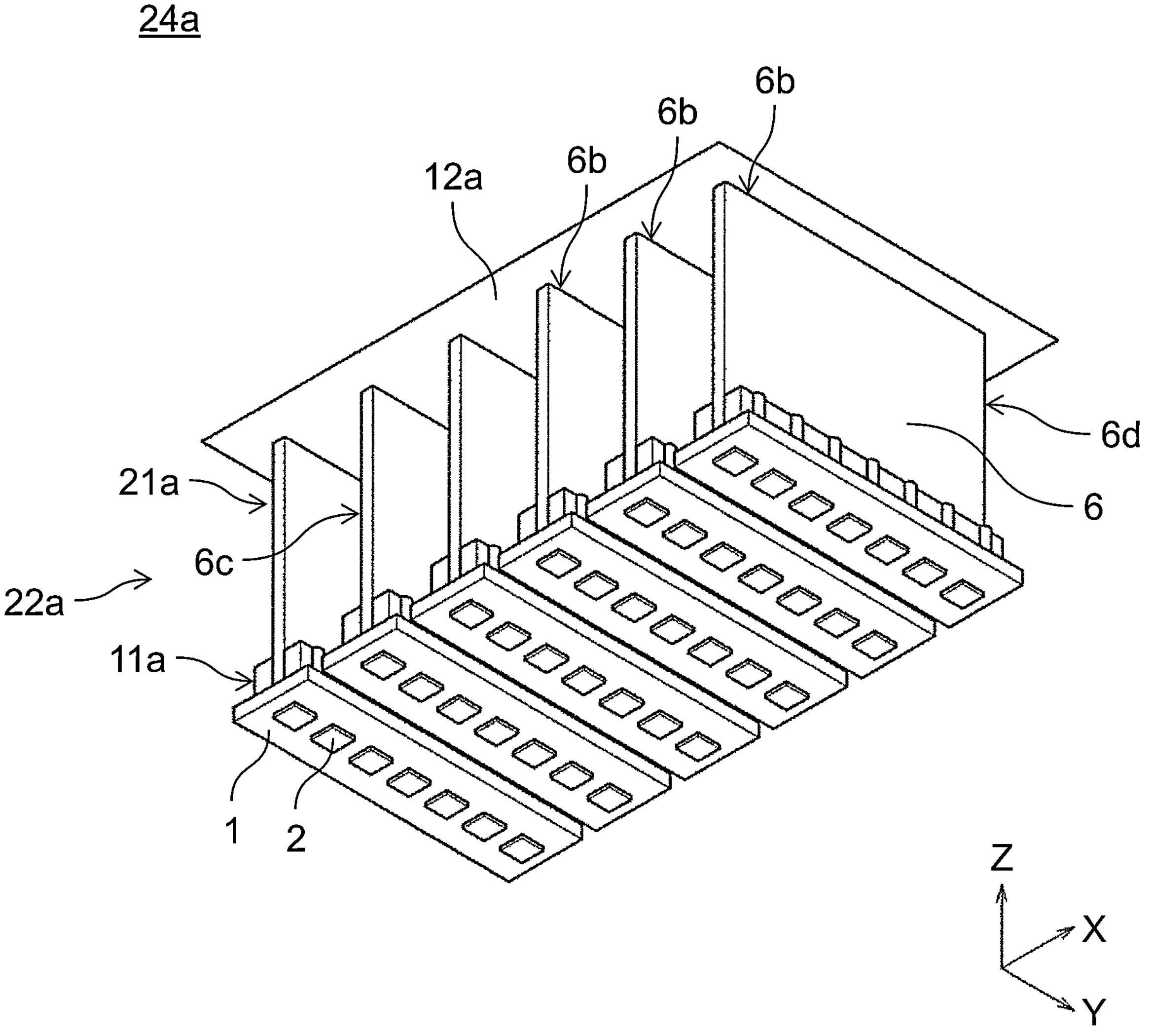
FIG. 13 is a perspective view illustrating an example of a configuration of an antenna unit in which the antenna array structure of FIG. 10 and a housing are assembled.
Figure 14:
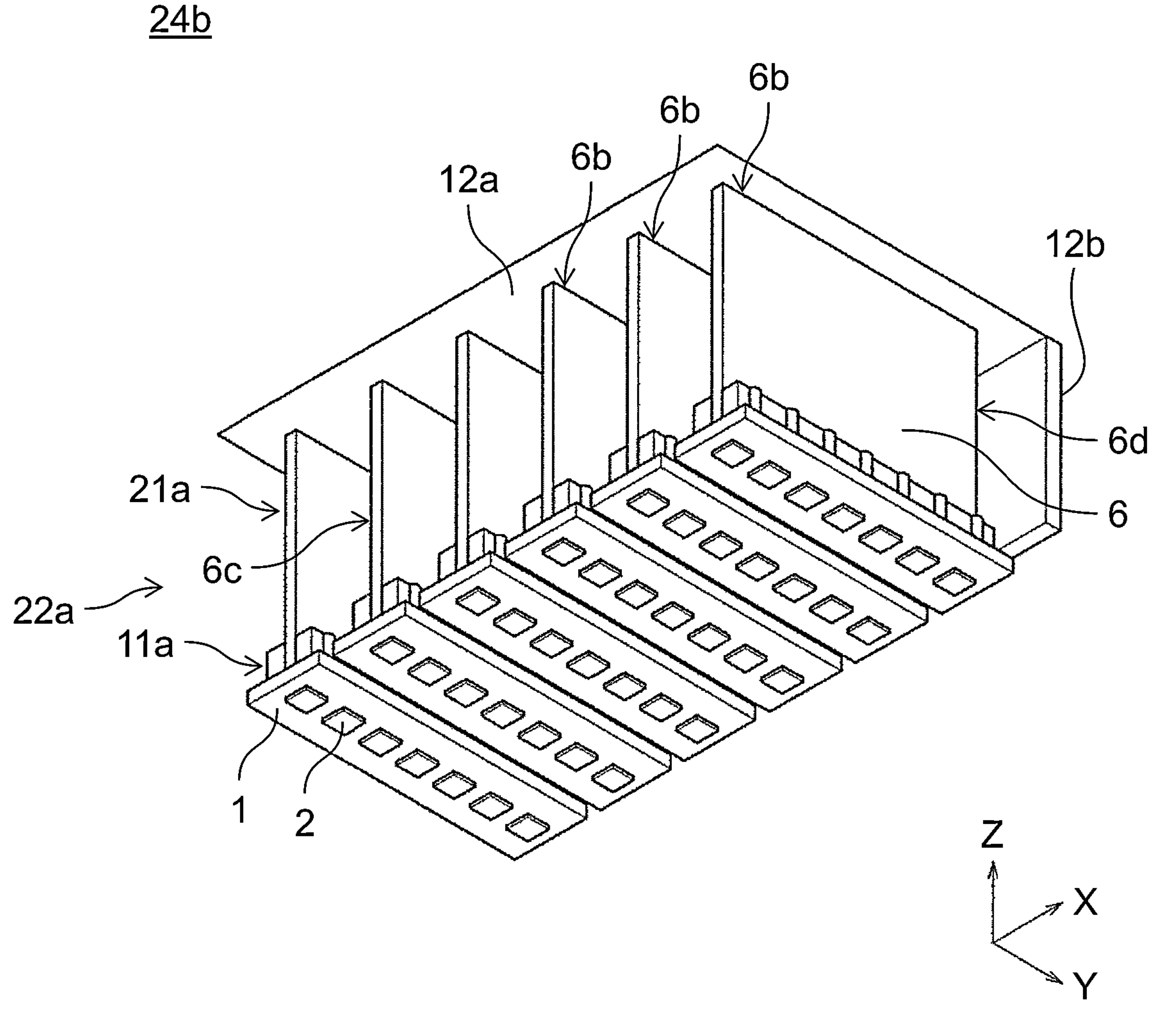
FIG. 14 is a perspective view illustrating another example of a configuration of the antenna unit in which the antenna array structure of FIG. 10 and a housing are assembled.

Furthermore, FIG. 13 is a perspective view illustrating example 24*a* of a configuration of an antenna unit in which antenna array structure 22*a* of FIG. 10 and housing 12*a* are assembled. FIG. 14 is a perspective view illustrating another example 24*b* of a configuration of an antenna unit in which antenna array structure 22*a* of FIG. 10 and housings 12*a*, 12*b* are assembled. Antenna units 24*a*, 24*b* can be configured substantially similarly to antenna units 23*a*, 23*b*. Here, detailed description is omitted.

In the antenna unit, the strength of the antenna array structure can be secured by the configuration in which the antenna array structure and the housing are assembled, and the assemblability can be improved.

Figure 15:
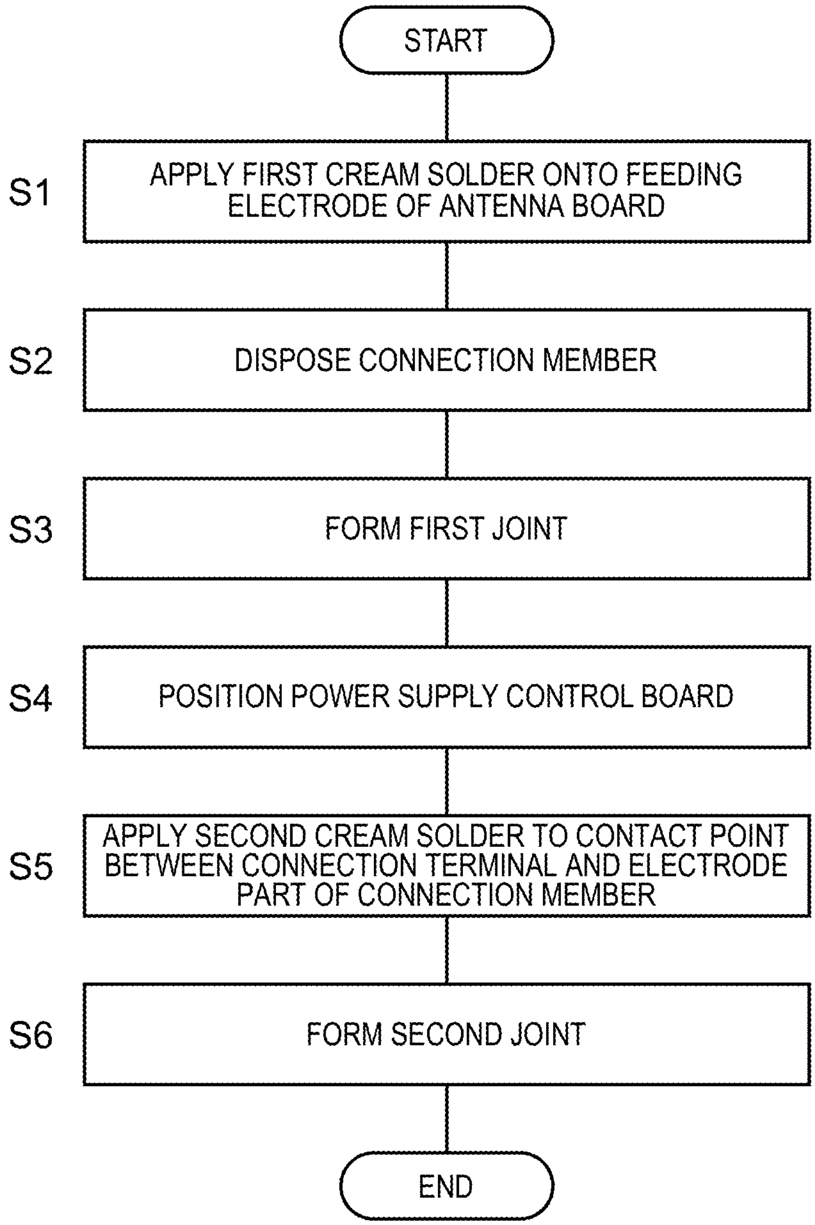
FIG. 15 is a flowchart illustrating an example of a manufacturing process of the antenna structure according to the first exemplary embodiment.

Next, a manufacturing process of the antenna structure will be described with reference to FIGS. 15 to 16F. FIG. 15 is a flowchart illustrating an example of a manufacturing process of antenna structure 21. FIGS. 16A to 16F are schematic diagrams illustrating an example of a manufacturing process of antenna structure 21 according to the first exemplary embodiment. Note that, since a conventionally known method can be adopted for mounting patch antenna element 2 on antenna board 1 and producing feeding electrode 3, the description thereof will be omitted in the following manufacturing method.

(Method of Manufacturing Antenna Structure)

As illustrated in FIG. 15, a method of manufacturing antenna structure 21 may include steps S1 to S6. Hereinafter, each step will be described with reference to the schematic diagrams illustrated in FIGS. 16A to 16F.

(Step S1)

Figure 16A:
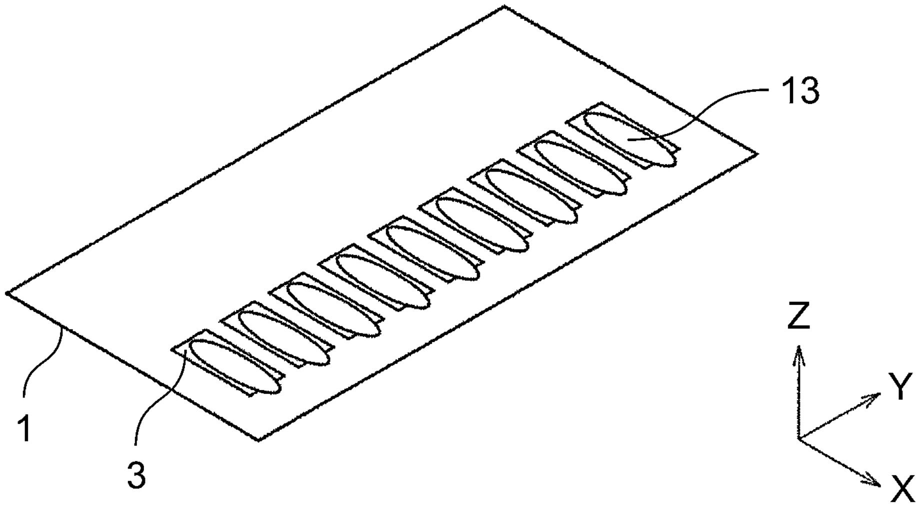
FIG. 16A is a schematic view illustrating an example of the manufacturing process of the antenna structure according to the first exemplary embodiment.

As illustrated in FIG. 16A, first cream solder 13 is applied onto feeding electrode 3 of antenna board 1. For example, first cream solder 13 having a composition of Sn-3.0Ag-0.5Cu can be supplied using a screen printing method. As a metal mask used for the screen printing, for example, a metal mask having a thickness of 80 μm may be used. Note that the supply of the first cream solder 13 is not limited to the screen printing method, and may be performed using other methods such as a dispensing method and an inkjet method.

(Step S2)

Figure 16B:
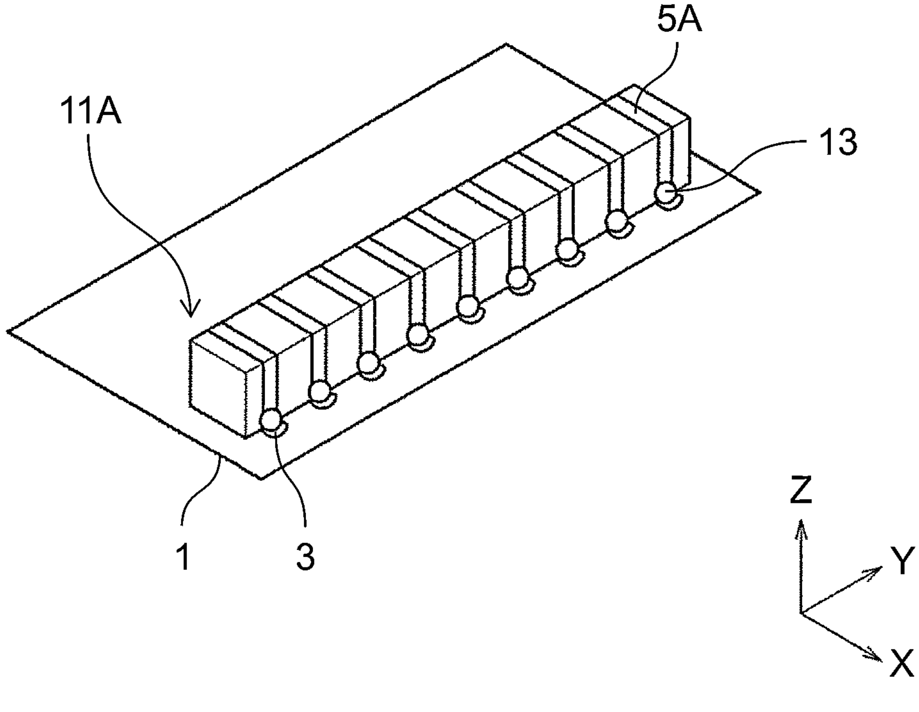
FIG. 16B is a schematic view illustrating an example of the manufacturing process of the antenna structure according to the first exemplary embodiment.

As illustrated in FIG. 16B, connection member 11A is disposed on antenna board 1 to which first cream solder 13 is applied in step S1. Here, by using connection member 11A in which electrode part 5A including the plurality of surface electrodes is formed on body 4, connection member 11A is positioned and attached to antenna board 1 such that each of the surface electrodes of electrode part 5A corresponds to each of feeding electrodes 3 formed on antenna board 1. In the exemplary embodiment illustrated in FIG. 16B, connection member 11A is disposed such that a longitudinal direction thereof is along the Y direction in the drawing.

(Step S3)

Figure 16C:
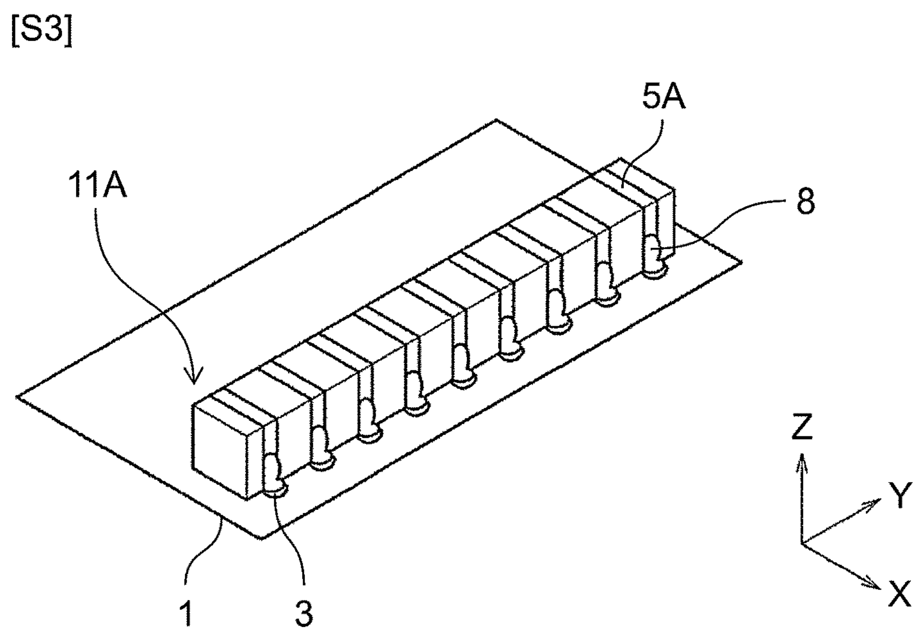
FIG. 16C is a schematic view illustrating an example of the manufacturing process of the antenna structure according to the first exemplary embodiment.

As illustrated in FIG. 16C, first joint 8 that joins electrode part 5A and feeding electrode 3 is formed. Here, antenna board 1 on which connection member 11A is disposed, which is obtained in step S2, is subjected to, for example, heating reflow processing at a peak temperature of 240° C. to melt and solidify first cream solder 13, so that first joint 8 that joins feeding electrode 3 of antenna board 1 and electrode part 5A of connection member 11A is formed as metal joining.

(Step S4)

Figure 16D:
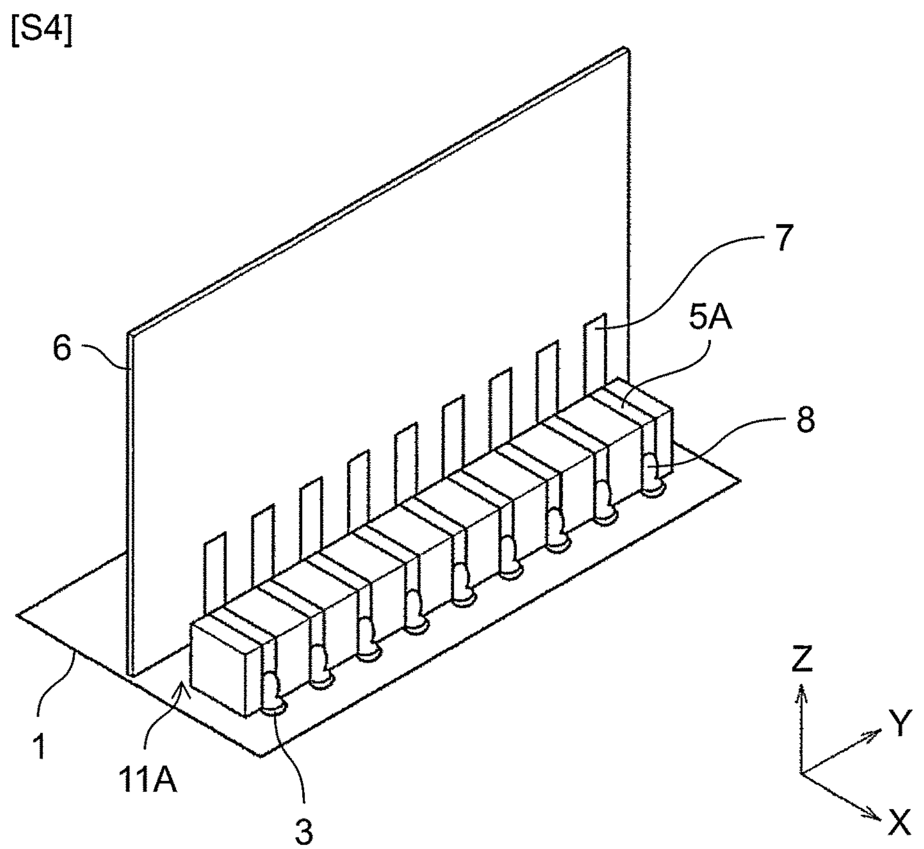
FIG. 16D is a schematic view illustrating an example of the manufacturing process of the antenna structure according to the first exemplary embodiment.

Next, as illustrated in FIG. 16D, power supply control board 6 is positioned. Here, power supply control board 6 including connection terminal 7 including a plurality of terminals can be used. In the exemplary embodiment illustrated in FIG. 16D, on the Y-Z plane where power supply control board 6 is disposed, power supply control board 6 is positioned with respect to antenna board 1 obtained in step S3 such that each of output terminals of power supply control board 6 and each of the surface electrodes of electrode part 5A of connection member 11A correspond to each other.

(Step S5)

Figure 16E:
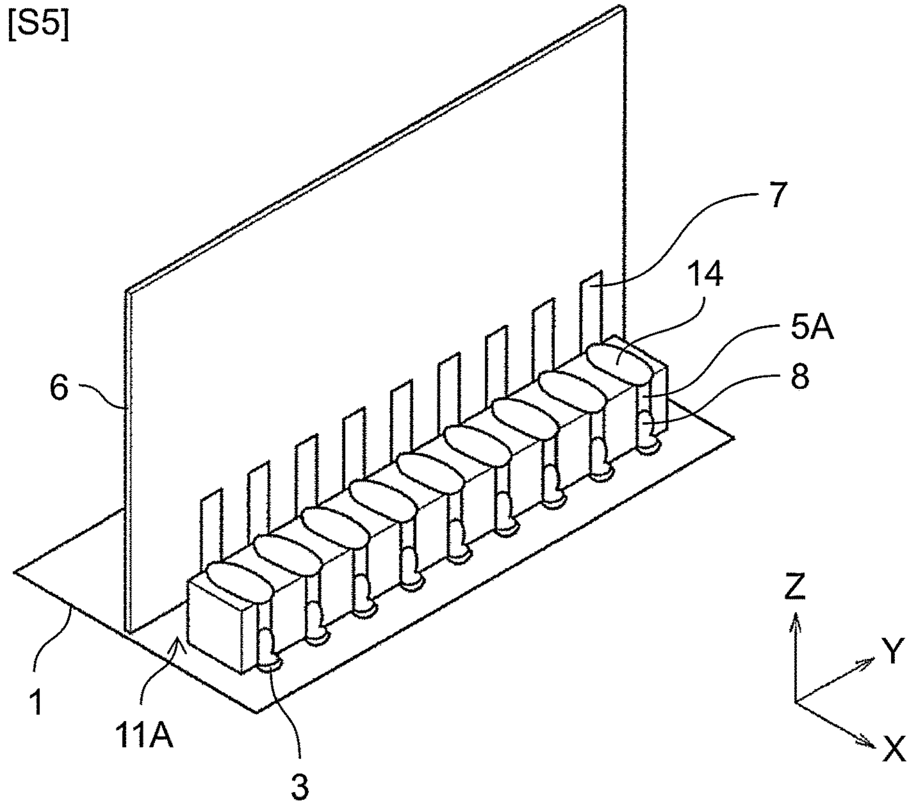
FIG. 16E is a schematic view illustrating an example of the manufacturing process of the antenna structure according to the first exemplary embodiment.
Figure 16F:
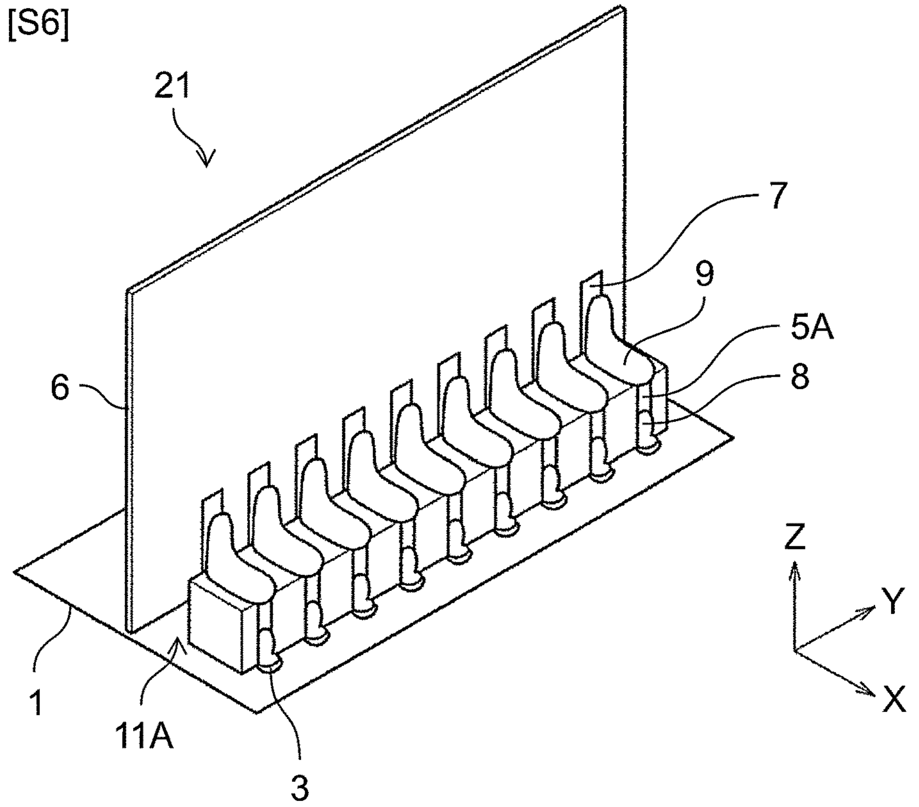
FIG. 16F is a schematic view illustrating an example of the manufacturing process of the antenna structure according to the first exemplary embodiment.

Next, as illustrated in FIG. 16E, second cream solder 14 is applied to a contact point between each of connection terminals 7 of power supply control board 6 and each of the surface electrodes of electrode part 5A of connection member 11A. Here, second cream solder 14 can be supplied to antenna board 1 on which power supply control board 6 is positioned, which is obtained in step S4, using, for example, a dispensing method.

Second cream solder 14 forms second joint 9 that joins connection terminal 7 and electrode part 5A by the subsequent heating reflow processing (subsequent step S6). During the subsequent heating reflow processing, first cream solder 13 constituting first joint 8 may be remelted due to heat conduction during the processing. In order to prevent this, the first joint and the second joint can be made of metal joining materials having different compositions. For example, second cream solder 14 has a lower melting point than first cream solder 13. For example, Sn—Bi composition can be used as second cream solder 14. Note that second cream solder 14 is not limited to the Sn—Bi based composition, and any composition having a melting point lower than that of first cream solder 13 can be applied.

Furthermore, the composition of second cream solder 14 does not necessarily have to have a melting point lower than a melting point of first cream solder 13. For example, in a case where remelting of first cream solder 13 due to heat conduction does not occur due to the manufacturing process, second cream solder 14 may be a material having the same melting point (composition) as first cream solder 13.

(Step S6)

Next, as illustrated in FIG. 16F, a second joint for joining connection terminal 7 and electrode part 5A is formed. Here, antenna board 1 to which second cream solder 14 is applied, which is obtained in step S5, is subjected to, for example, heating reflow processing at a peak temperature of 180° C. to melt and solidify second cream solder 14, so that second joint 9 that joins connection terminal 7 of power supply control board 6 and electrode part 5A of connection member 11A is formed as metal joining.

Through the above steps, antenna structure 21 can be manufactured. Note that the method of manufacturing antenna structure 21 through S1 to S6 described above is merely an example, and the manufacturing of antenna structure 21 is not limited to this method. Furthermore, in the manufacturing process of antenna structure 21, materials to be used or production conditions are also examples, and the manufacturing is not limited to the above contents.

Although the antenna structure in which the patch antenna elements are arrayed in a planar manner has been described in the above exemplary embodiment, the present disclosure is not limited thereto. For example, the antenna structure may include patch antenna elements arrayed in a curved shape.

Furthermore, in the above exemplary embodiment, the antenna array structure configured by the antenna structures having the similar configuration has been described. However, the present disclosure is not limited thereto. For example, the antenna array structure may include antenna structures having different configurations from one another.

As described above, the accompanying drawings and the detailed description have been provided to describe exemplary embodiment of the technique in the present disclosure. Thus, components described in the accompanying drawings and the detailed description may include not only components essential for solving the problem, but also components non-essential for solving the problem to illustrate the above techniques. For this reason, it should not be immediately recognized that these non-essential components are essential just because these non-essential components are described in the accompanying drawings and the detailed description.

Although the present disclosure has been fully described in connection with preferred exemplary embodiment with reference to the accompanying drawings, various modifications can be made within the scope of the claims. Such modifications and exemplary embodiments obtained by appropriately combining technical units disclosed in different exemplary embodiments are also included in the technical scope of the present disclosure.

INDUSTRIAL APPLICABILITY

The present disclosure is applicable to an antenna device including an antenna structure and an antenna array structure.

REFERENCE MARKS IN THE DRAWINGS

1: antenna board
2: patch antenna element
3: feeding electrode
4: body of connection member
5A, 5B, 5C: electrode part of connection member
6: power supply control board
7: connection terminal
8: first joint
9: second joint
11A, 11B, 11C: connection member
11*a*, 11*b*, 11*c*: connection member
12*a*, 12*b*: housing
13: first cream solder
14: second cream solder
21, 21*a*: antenna structure
22, 22*a*: antenna array structure
23*a*, 23*b*, 24*a*, 24*b*: antenna unit

The invention claimed is:

1. An antenna structure comprising:
an antenna board including a first surface and a second surface that is opposite to the first surface;
a plurality of patch antenna elements arrayed on the first surface of the antenna board;
a feeding electrode formed on the second surface of the antenna board and electrically connected to each of the plurality of patch antenna elements;
a power supply control board that is disposed away from the second surface of the antenna board, extends in a direction intersecting the second surface of the antenna board, and includes a third surface and a fourth surface that is opposite to the third surface; and
a connection member disposed on the second surface of the antenna board and on at least one of the third surface and the fourth surface of the power supply control board, the connection member electrically connecting the feeding electrode and the power supply control board,
wherein the power supply control board includes a connection terminal, and
the connection member includes
a body having an insulation property,
an electrode part formed on a surface of the body,
a first joint that joins the electrode part and the feeding electrode by metal joining, and
a second joint that joins the electrode part and the connection terminal by metal joining.

2. The antenna structure according to claim 1, wherein
the connection member includes
a first connection member disposed on the third surface of the power supply control board, and
a second connection member that is disposed on the fourth surface of the power supply control board and faces the first connection member with a gap between the first connection member and the second connection member, and
the power supply control board includes an end disposed in the gap.

3. The antenna structure according to claim 2, wherein
the gap has a width L in a direction in which the first connection member and the second connection member are arranged,
the power supply control board has a thickness T, and
$(T+0.05\ \text{mm})<L<(T+1\ \text{mm})$ is satisfied.

4. The antenna structure according to claim 1, wherein the connection member is disposed along a direction in which the plurality of patch antenna elements is arrayed.

5. The antenna structure according to claim 1, wherein
the body of the connection member contains a resin material, and
the resin material includes any one of LCP, PPA, ABS, PEEK, and PC.

6. The antenna structure according to claim 1, wherein the first joint has a composition different from a composition of the second joint.

7. An antenna array structure comprising a plurality of the antenna structures according to claim 1, wherein
the plurality of patch antenna elements is arrayed along a first direction on the first surface of the antenna board, and
the plurality of antenna structures is arrayed along a second direction orthogonal to the first direction.

8. The antenna array structure according to claim 7, wherein the antenna boards adjacent to each other include adjacent end surfaces between which an interval is greater than 0 mm and less than or equal to 10 mm in a direction of array of the plurality of antenna structures.

* * * * *